US008654914B2

(12) United States Patent
Chavali et al.

(10) Patent No.: US 8,654,914 B2
(45) Date of Patent: Feb. 18, 2014

(54) SYSTEM AND METHOD FOR ADAPTIVE TIME SYNCHRONIZATION

(75) Inventors: Nanda Kishore Chavali, Hyderabad (IN); Venkata Krishna Reddy Pilli, Andhara Pradesh (IN)

(73) Assignee: Uurmi Systems Pvt. Ltd (IN)

( * ) Notice: Subject to any disclaimer, the term of this patent is extended or adjusted under 35 U.S.C. 154(b) by 238 days.

(21) Appl. No.: 13/304,794

(22) Filed: Nov. 28, 2011

(65) Prior Publication Data
US 2013/0136198 A1    May 30, 2013

(51) Int. Cl.
*H04L 7/00* (2006.01)
(52) U.S. Cl.
USPC ............................ 375/354; 375/342; 370/503
(58) Field of Classification Search
USPC ......... 375/259–260, 342–343, 354, 356, 359; 370/203, 206, 503
See application file for complete search history.

(56) References Cited

U.S. PATENT DOCUMENTS

| 8,077,696 B2* | 12/2011 | Izumi et al. | 370/350 |
| 2004/0190560 A1* | 9/2004 | Maltsev et al. | 370/503 |
| 2006/0029164 A1* | 2/2006 | Hwang | 375/340 |

\* cited by examiner

*Primary Examiner* — Jean B Corrielus
(74) *Attorney, Agent, or Firm* — Benjamin A. Balser; Balser & Grell IP Law

(57) ABSTRACT

A method of estimating a symbol boundary for adaptive time synchronization in a communication system is presented. An embodiment of the method includes receiving a signal comprising a plurality of OFDM symbols from receiver chains. The OFDM symbols include at least a long training field (LTF) symbol. The method further includes determining a normalized correlation signal based on correlation between the received LTF symbol and a reference symbol for each of the receiver chains for different lags. Also, the method includes estimating an energy window length for the normalized correlation signal. The energy window length includes at least one of channel delay spread and a maximum cyclic shift applied to the signal. The method then includes estimating the symbol boundary associated with the received LTF symbol based on a position of peak energy of the normalized correlation signal using the estimated energy window length.

23 Claims, 18 Drawing Sheets

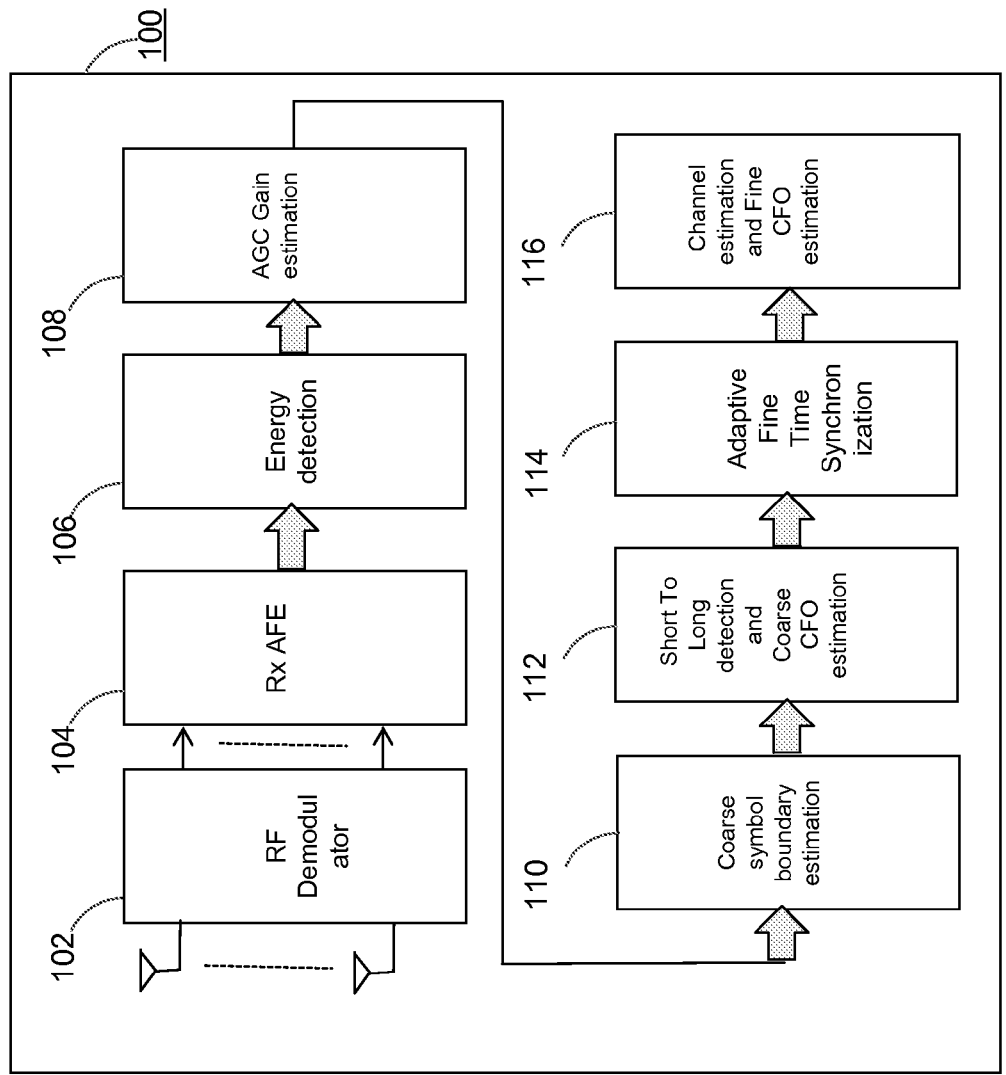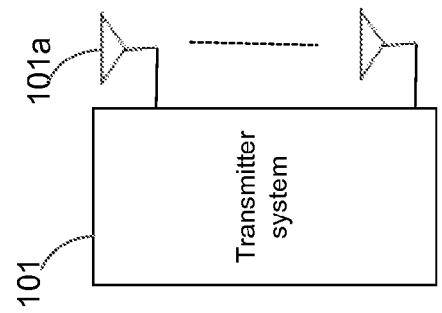
FIG. 1

SYSTEM AND METHOD FOR ADAPTIVE TIME SYNCHRONIZATION

FIELD OF THE INVENTION

The present invention relates to a wireless communication system and more particularly relates to a system and method for adaptive time synchronization in the wireless communication system.

BACKGROUND

In the past decade, there has been enormous development in the area of wireless communication systems. Particularly, wireless local area network (WLAN) technology has emerged as one of the prevailing wireless technologies throughout the world. Also, in the fourth-generation, the WLAN technology may play an important role in the wireless and mobile communication systems.

Typically, WLAN devices may operate in accordance with one or more protocol standards including, but not limited to, IEEE 802.11. Moreover, the protocol standards for the WLAN devices are upgraded based on certain factors, such as the data rate and throughput requirements, in the communication system. For example, the IEEE 802.11 specification has evolved to IEEE 802.11 standard, which later evolved to IEEE 802.11b standard. Further, the 802.11b standard has evolved to IEEE 802.11g standard and then to IEEE 802.11n standard.

In addition, the WLAN devices may include legacy devices, high throughput (HT) devices, and very high throughput (VHT) devices. The legacy devices are compliant to IEEE 802.11abg standards. Also, the legacy devices may provide a maximum data rate of 54 Mbps. On the other hand, the high throughput (HT) devices are compliant to IEEE 802.11n standard. With the development of MIMO-OFDM technology, the HT devices may provide a maximum data rate of 600 Mbps. In a similar manner, the VHT devices are compliant to IEEE 802.11ac standard. Moreover, there has been development in a very high throughput physical layer and a medium access controller (MAC) layer of the VHT devices to support a data rate of more than 1 Gbps.

Typically, a device that is complaint to IEEE 802.11n standard should be backward compatible to the legacy devices supporting a legacy frame format in addition to HT mixed and green-field formats. Similarly, a device that is complaint to IEEE 802.11ac standard should be backward compatible to the legacy devices and HT devices supporting legacy and HT frame formats in addition to its own VHT mixed format. To achieve this compatibility, a device at a receiver end should be capable of detecting the format of the frame for successful decoding of the frame/packet. For proper detection of the format, the receiver device should first have accurate time synchronization that suits for all frame formats in VHT wireless LAN.

Since OFDM modulation is employed in VHT wireless LAN, the receiver device may be very sensitive to time and frequency synchronization. Without proper time synchronization, the orthogonality of the subcarriers will be lost and there will be inter symbol interference (ISI) and inter carrier interference (ICI) in the demodulated data. This ISI and ICI may further cause many bits errors in the decoded data. Moreover, with multiple antennas at the transmitter end and the receiver end, the synchronization problem will be much more complicated. Thus, for all these reasons, there is a need for proper time synchronization in the wireless communication systems.

In a conventional system, the time synchronization is based on the correlation between a received preamble and a transmitted preamble of a frame/signal. However in the VHT wireless LAN, since the same preamble is transmitted from the different antennas with different cyclic shifts and there are different frame formats to be supported, the computed correlation between the received preamble and the transmitted preamble may be spread by unknown amount at the receiver. Because of this spread, the time synchronization may not be accurate and there will be ISI and ICI in the demodulated data, which cause many bit errors in the decoded data.

It is therefore desirable to develop a robust and adaptive time synchronization technique that suits for all frame formats in VHT wireless LAN and works well for signals with variable cyclic shifts applied at the transmitter. Also, the synchronization technique should be capable of synchronizing the receiver for all frame formats even under variable multipath channel delay spread and fading conditions.

SUMMARY

Briefly in accordance with one aspect of the technique, a method of estimating a symbol boundary for adaptive time synchronization in a communication system is presented. The method includes receiving a signal comprising a plurality of orthogonal frequency division multiplexing (OFDM) symbols from a plurality of receiver chains. The OFDM symbols include at least a long training field (LTF) symbol. The method further includes determining a normalized correlation signal based on correlation between the received LTF symbol and a reference symbol for each of the receiver chains for different lags. Also, the method includes estimating an energy window length for the normalized correlation signal. The estimated energy window length includes at least one of channel delay spread and maximum cyclic shift applied to the signal at a transmitter. The method then includes estimating the symbol boundary associated with the received LTF symbol based on a position of peak energy of the normalized correlation signal computed using the estimated energy window length.

In accordance with a further aspect of the present technique, an apparatus for estimating a symbol boundary in a communication system is presented. The apparatus includes a plurality of receiver chains configured to receive a signal comprising a plurality of orthogonal frequency division multiplexing (OFDM) symbols. The OFDM symbols include at least a long training field (LTF) symbol. The apparatus further includes a LTF sequence correlator communicatively coupled to the plurality of receiver chains, and configured to determine a normalized correlation signal based on correlation between the received LTF symbol and a reference symbol for each of the receiver chains for different lags. The apparatus also includes a window length estimator communicatively coupled to the sequence correlator, and configured to estimate an energy window length for the normalized correlation signal. The energy window length comprises at least one of channel delay spread and maximum cyclic shift of the signal applied to the signal at the transmitter. In addition, the apparatus includes a symbol boundary estimator communicatively coupled to the window length estimator, and configured to estimate the symbol boundary associated with the received LTF symbol based on a position of peak energy of the normalized correlation signal computed using the estimated energy window length.

In accordance with another aspect of the present technique, a method for adaptive time synchronization in a communication system is presented. The method includes receiving a signal comprising a plurality of orthogonal frequency division multiplexing (OFDM) symbols from a plurality of receiver chains. The OFDM symbols include at least a long training field (LTF) symbol. The method further includes adaptively estimating an energy window length comprising at least one of channel delay spread and maximum cyclic shift applied to the signal at a transmitter. The method also includes estimating a symbol boundary associated with the received LTF symbol based on a position of peak energy of a normalized correlation signal using the estimated energy window length. The method then includes advancing the estimated symbol boundary based on the maximum cyclic shift applied to the signal at the transmitter subsequently.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein:

FIG. 1 illustrates a block diagram of a portion of a receiver system, in accordance with aspects of the present technique;

DETAILED DESCRIPTION

Figure 2:
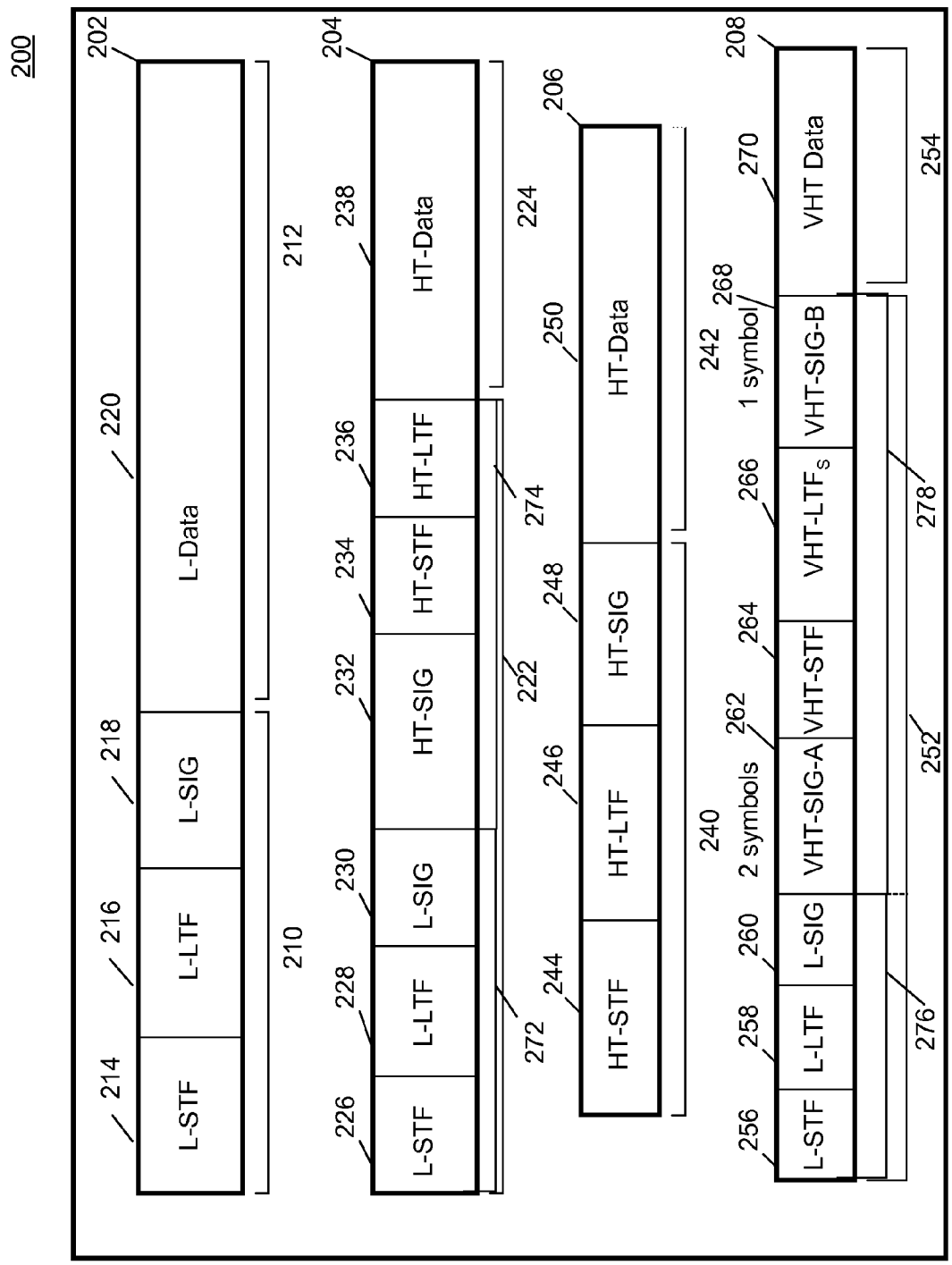
FIG. 2 is a block diagram illustrating frames in a legacy format, a high throughput-mixed mode (HT-MM) format, a HT-Greenfield (HT-GF) format, and a very high throughput (VHT) mixed format, in accordance with aspects of the present technique.

As will be described in detail hereinafter, various embodiments of an exemplary receiver in a wireless communication system and method of estimating a symbol boundary for adaptive time synchronization are presented. By employing the receiver system and the method for adaptive time synchronization hereinafter, OFDM symbol boundary is estimated accurately and wrong decoding/demodulating of the received signal may be substantially reduced. In addition, the exemplary method is a robust and adaptive time synchronization technique that is capable of synchronizing the receiver for all frame formats even under variable multipath channel delay spread and variable cyclic shift applied to the signal at the transmitter.

Turning now to the drawings, and referring to FIG. 1, a block diagram of a portion of a receiver system 100, in accordance with aspects of the present technique, is depicted. For ease of understanding, only the system level blocks that are relevant to the present technique are shown in FIG. 1. It is to be noted that the receiver system 100 may include other blocks, and is not limited to the blocks shown in FIG. 1.

Further, FIG. 1 illustrates an embodiment of the receiver system 100 coupled to multiple transmit and multiple receive (MIMO) antennas. The MIMO antennas in the portion of receiver system 100 may receive a frame from different transmit chains of a transmitter system 101. Particularly, the MIMO antennas include multiple antennas, and each of the antennas is configured to receive signal from the transmitter system 101. In one embodiment, the receiver system 100 may be communicatively coupled to a single receiver antenna, which receives signal from a transmitter 101a of the transmitter system 101.

In accordance with aspects of the present technique, the portion of the receiver system 100 includes a radio frequency (RF) demodulator unit 102, a receiver (Rx) analog front end (AFE) 104, an energy detection unit 106, a AGC gain estimation unit 108, a coarse symbol boundary estimation unit 110, a short-to-long (S2L) detection and coarse CFO estimation unit 112, an adaptive fine time synchronization unit 114, and a channel estimation and fine CFO estimation unit 116. The energy detection unit 106 is communicatively coupled to multiple receive chains of Rx AFE 104. The Rx AFE 104 is communicatively coupled to RF demodulator 102 with single or multiple receive antennas. The Rx AFE 104 includes multiple analog to digital converter (ADC) units to convert analog baseband signal into digital samples and multiple receive filters to filter out of band signal from ADC digital samples.

Further, the energy detecting unit 106 receives analog to digital converter (ADC) samples associated with a frame from the corresponding receive chain of Rx AFE 104, and energy in the received samples is detected. The ADC samples may be associated with orthogonal frequency division multiplexing (OFDM) symbols in the received frame. The ADC samples from each receive chain of Rx AFE 104 are then sent to the AGC estimating unit 108 where AGC gain is estimated for each ADC of Rx AFE such that the received signal will occupy the full ADC bit width on each receiver chain.

Further, the ADC samples from all receive chains are sent to the coarse symbol boundary estimation unit 110. In the coarse symbol boundary estimation unit 110, the received ADC samples on each receive chain are cross correlated with a reference short symbol for one short symbol duration and the magnitudes of correlated outputs on all receiver chains are added. Further, a sample index corresponding to the maximum amplitude of the added correlation gives the short symbol boundary, which may be further used for coarse symbol time synchronization. Thereafter, the short-to-long detection and coarse CFO estimation unit 112 is employed to detect a long training field (LTF) in the received signal and estimate coarse carrier frequency error in the ADC samples. The long training field (LTF) is detected if the maximum normalized correlation of received short symbols falls below a predefined value.

Upon detecting the long training field, the adaptive fine time synchronization unit 114 performs an adaptive time synchronization method which is explained in greater detail with reference to FIGS. 2-18. After accurate adaptive time synchronization, the channel estimation and fine CFO estimation unit 116 is used for estimating channel frequency response and the fine carrier frequency error in the received ADC samples.

Referring to FIG. 2, a block diagram 200 illustrating frames in the legacy format, the high throughput-mixed mode (HT-MM) format, the HT-Greenfield (HT-GF) format, and the very high throughput (VHT) mixed format, in accordance with aspects of the present technique, is depicted. The legacy frame 202 is transmitted in a non-HT mode with a coding rate greater than or equal to 6 Mbps, and the format of the legacy frame 202 is as per the standard IEEE 802.11a specification. The legacy frame 202 includes a preamble portion 210 and a data portion 212. Further, the preamble portion 210 includes 10 short training field (L-STF) symbols 214, 2 long training field (L-LTF) symbols 216, and a legacy signal field (L-SIG) symbol 218. The short and long training field (STF and LTF) symbols 214, 216 are primarily used for packet detection, automatic gain control (AGC) and channel training. The signal field (SIG) symbol 218, as defined in the specification IEEE802.11a, contains signal information pertaining to the data portion 212 of the frame 202. Particularly, the legacy signal field (L-SIG) symbol 218 includes the information of the data portion 212, such as data modulation, number of symbols, coding rate, and parity bit protection. The receiver system 100 uses this information, contained in the L-SIG symbol 218, to set-up the subsequent decoding process of data symbols 220.

In accordance with aspects of the present technique, the HT mixed mode frame 204 is transmitted as per the standard 802.11n specification. The HT mixed mode includes a preamble portion 222 and a data portion 224. The preamble portion 222 further includes a non-HT part 272 and a HT part 274. The non-HT part 272 of the preamble is similar to the preamble portion 210 of the legacy frame 202, which includes 10 short training field (L-STF) symbols 226, 2 long training field (L-LTF) symbols 228, and a signal field (L-SIG) symbol 230. The HT part 274 of the preamble portion 222 is followed by the non-HT part 272. The HT part 274 includes 2 HT signal field (HT-SIG) symbols 232, HT short symbols (HT-STF) 234, and HT long symbols (HT-LTF) 236, as depicted in FIG. 2. The HT signal field (HT-SIG) symbols 232 contain signal information pertaining to the data portion 224 of the frame 204. The HT part 274 of the preamble portion 222 is then followed by the data portion 224 that includes HT data (HT-data) 238.

Further, the HT-Greenfield (HT-GF) frame 206 is a new high throughput frame, and the format of the HT-GF frame 206 does not include a legacy part. For example, the HT-GF frame 206 does not include the preamble portion 210 of the legacy frame 202. The HT-GF frame 206 includes a preamble portion 240 and a data portion 242. The preamble portion 240 includes HT short training field (HT-STF) symbols 244, HT long training field (HT-LTF) symbols 246, and 2 HT signal field (HT-SIG) symbols 248, and they are arranged in a sequence as depicted in FIG. 2. The HT-SIG symbols contain the signal information pertaining to the data portion 242 of the frame 206.

In a similar manner, the very high throughput (VHT) mixed frame 208 includes a preamble portion 252 and a data portion 254. The preamble portion 252 includes a legacy part 276 and a VHT part 278. The legacy part 276 includes 10 short training field (L-STF) symbols 256, 2 long training field (L-LTF) symbols 258, and a legacy signal field (L-SIG) symbol 260. The VHT part 276 of the preamble portion 252 includes VHT signal field (VHT-SIG-A) symbols 262, VHT short training field (VHT-STF) symbols 264, VHT long training field (VHT-LTF) symbols 266, and VHT signal field (VHT-SIG-B) symbol 268, as depicted in FIG. 2. Further, the VHT-SIG-A symbols 262 include two signal field symbols: a first VHT-SIG-A symbol and a second VHT-SIG-A symbol. However, the VHT-SIG-B 268 includes only one signal field symbol.

Moreover, the above mentioned frames are typically transmitted using a standard baseband OFDM transmitter 101a (as depicted in FIG. 1). Particularly, the OFDM symbols in each frame may be transmitted either using single transmit chain or multiple transmit chains. While transmitting from multiple transmit chains, different cyclic shifts are applied to signals to prevent unintentional beam forming.

Figure 3:
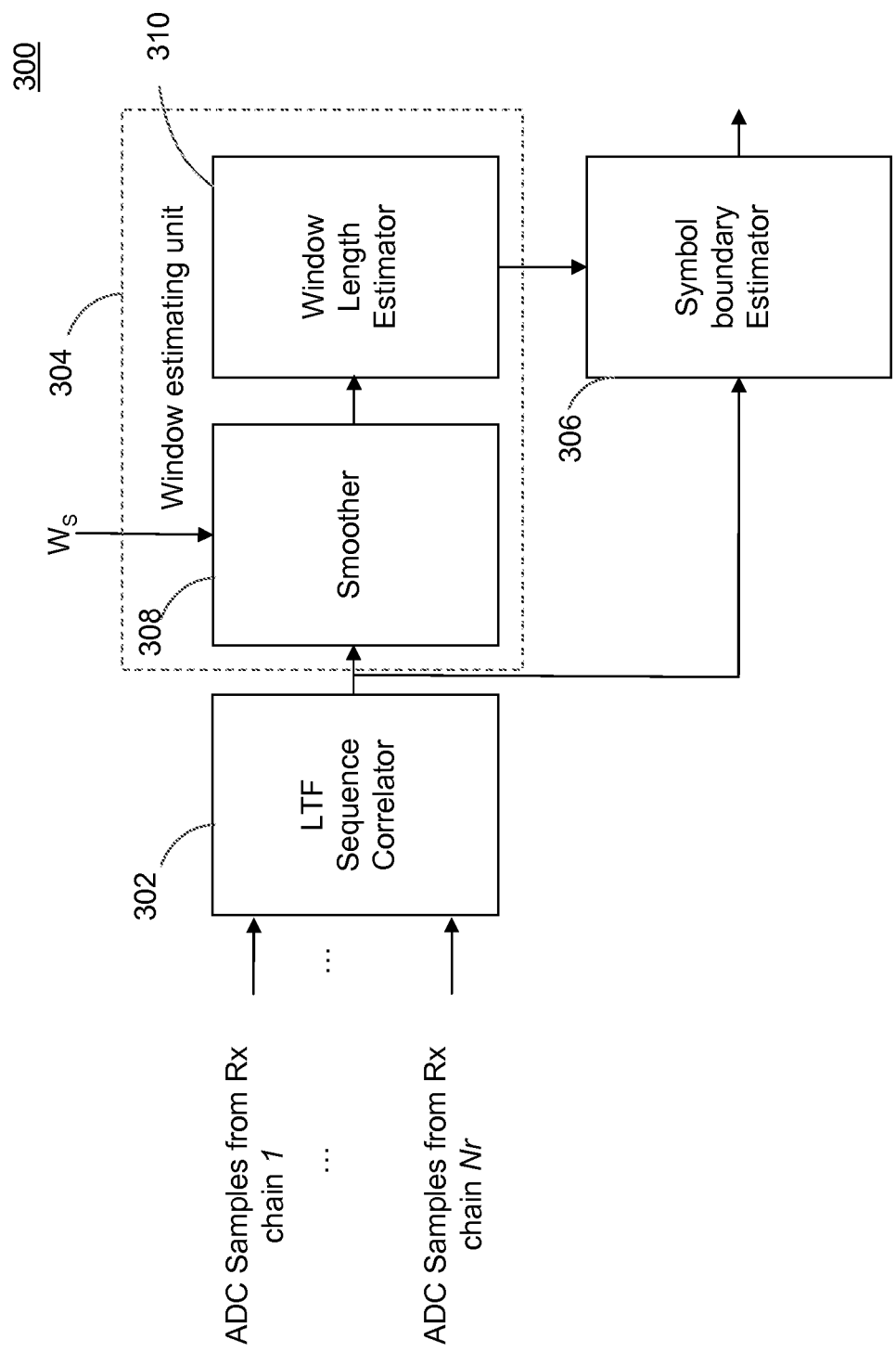
FIG. 3 illustrates a block diagram of an adaptive time synchronization system, in accordance with aspects of the present technique.

FIG. 3 illustrates a block diagram of adaptive fine time synchronization (AFTS) system 300, in accordance with aspects of the present technique. The adaptive fine time synchronization system 300 may be a representative of the adaptive fine time synchronization unit 114 of FIG. 1. The AFTS system 300 is employed to estimate long training field (LTF) symbol boundary for fine time synchronization for a received signal/frame. The received frame may be the legacy frame, the HT-MM frame, the HT-GF frame, or the VHT mixed frame. Further, the received frame may include at least one long training field (LTF) as one among the plurality of fields in the frame. Moreover, the LTF may include information that is used for determining the channel frequency response of the received signal/frame.

In addition, the STF and LTF fields are used for frame and frequency synchronization. Also, using the initial LTF, channel frequency response is estimated, which is further used for channel equalization of symbols that are followed by STF and LTF symbols. Particularly, the channel equalization of sub-symbols of each symbol is performed after OFDM demodulation using Discrete Fourier Transform (DFT).

In accordance with aspects of the present technique, the AFTS system 300 includes a LTF sequence correlator 302, a window estimating unit 304, and a symbol boundary estimator 306. The LTF sequence correlator 302 is communicatively coupled to the receiver chains of Rx AFE 104 of the receiver system 100 of FIG. 1. The LTF sequence correlator 302 is configured to receive ADC samples from Rx AFE 104. The ADC samples include a plurality of orthogonal frequency division multiplexing (OFDM) symbols. Further, the plurality of OFDM symbols may include LTF symbols.

In accordance with the embodiment, the sequence correlator 302 is configured to compute correlation between the received LTF symbol and a reference symbol for each of the receiver chains for different lags. Particularly, the sequence correlator 302 is configured to determine a normalized correlation signal based on the computed correlation between the received LTF symbol and a reference symbol. The aspect of determining normalized correlation signal will be explained in greater detail with reference to FIG. 4.

Figure 8:
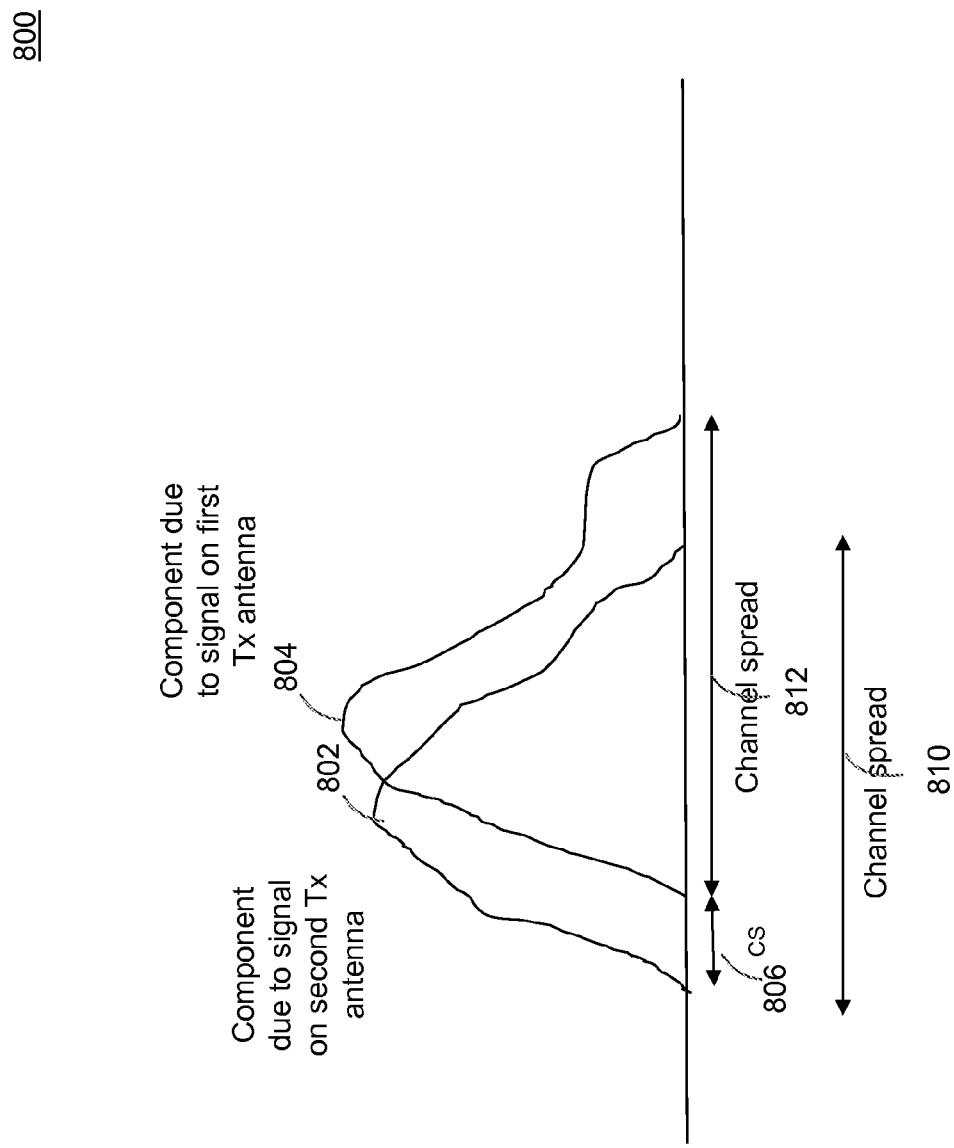
FIG. 8 illustrates components of a normalized correlation signal prior to smoothening the signal.
Figure 9:
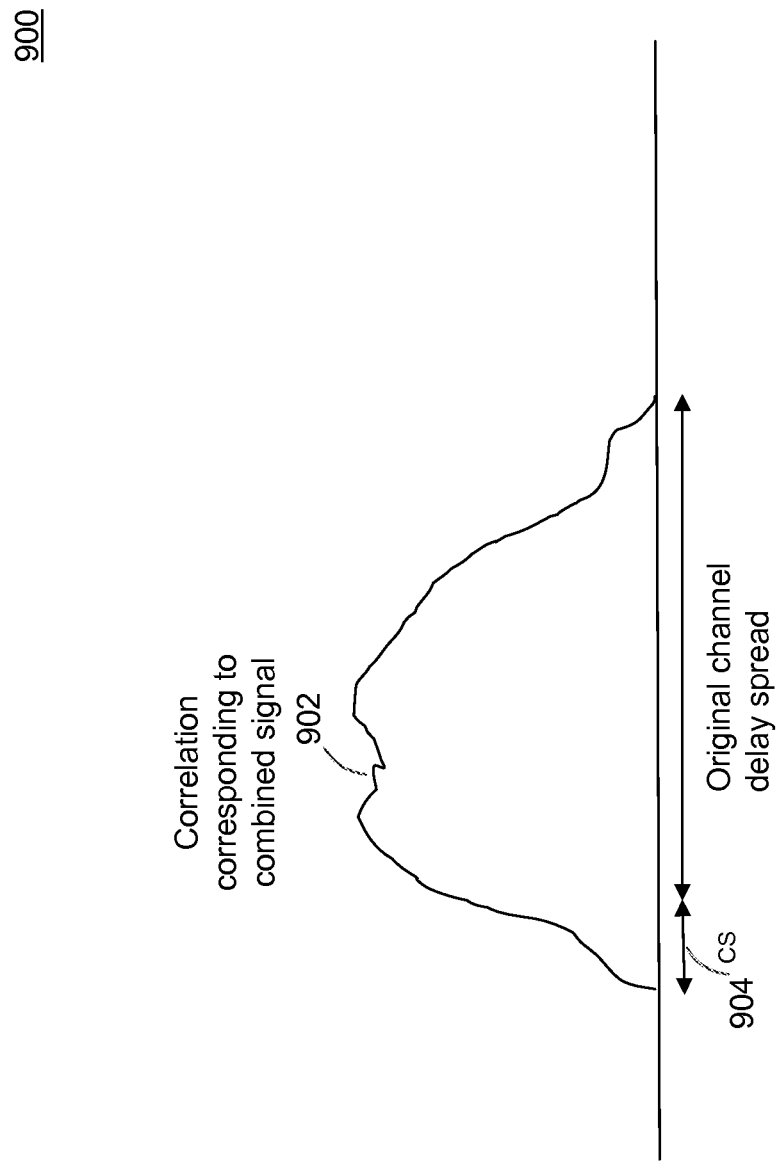
FIG. 9. illustrates a normalized correlation signal obtained after combining components of the signal shown in FIG. 8.

In addition, the window estimating unit 304 is communicatively coupled to the sequence correlator 302, and configured to estimate an energy window length for the normalized correlation signal. The energy window length includes at least one of channel delay spread and the maximum cyclic shift applied to the signal at the transmitter 101a. For example, FIG. 8 shows signal components of the received normalized correlation signal for 2 transmit and 1 receive antenna (2.times.1) scenario. Two signal component 802, 804 of the normalized correlation signal are spread by an amount equal to channel delay spread 810, 812 and the two components differ in time by an amount equal to the maximum cyclic shift 806 applied at the transmitter 101a. Further, FIG. 9 shows the received normalized correlation signal, which is the sum of two correlation components 802, 804 shown in FIG. 8. From FIG. 9, it is clear that the total spread of the normalized correlation signal is equal to the sum of the length of the channel delay spread 810 or 812 and the maximum cyclic shift 806 applied at the transmitter 101*a*.

Figure 10:
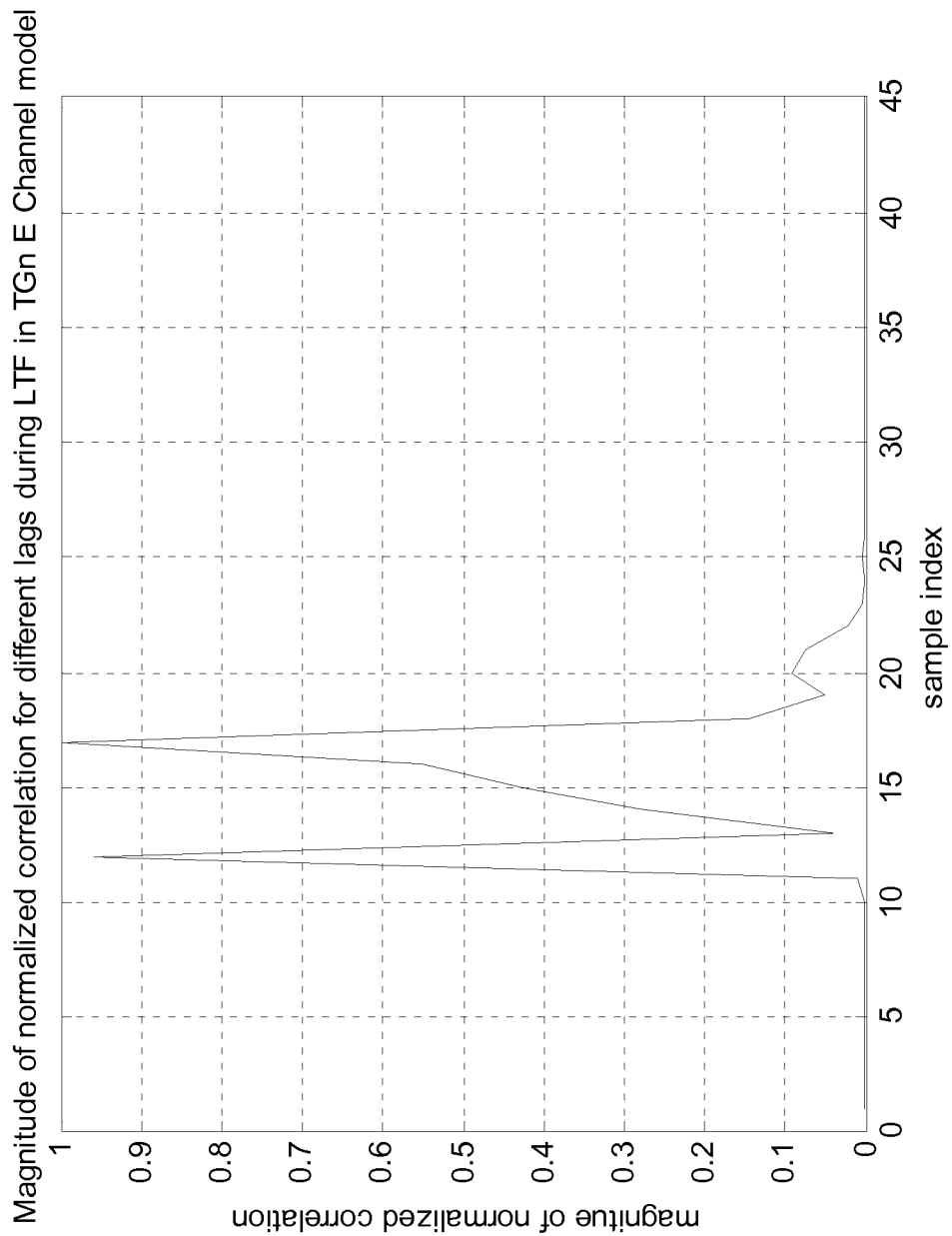
FIG. 10. illustrates an example of normalized correlation signal obtained in TGN-E channel model.
Figure 11:
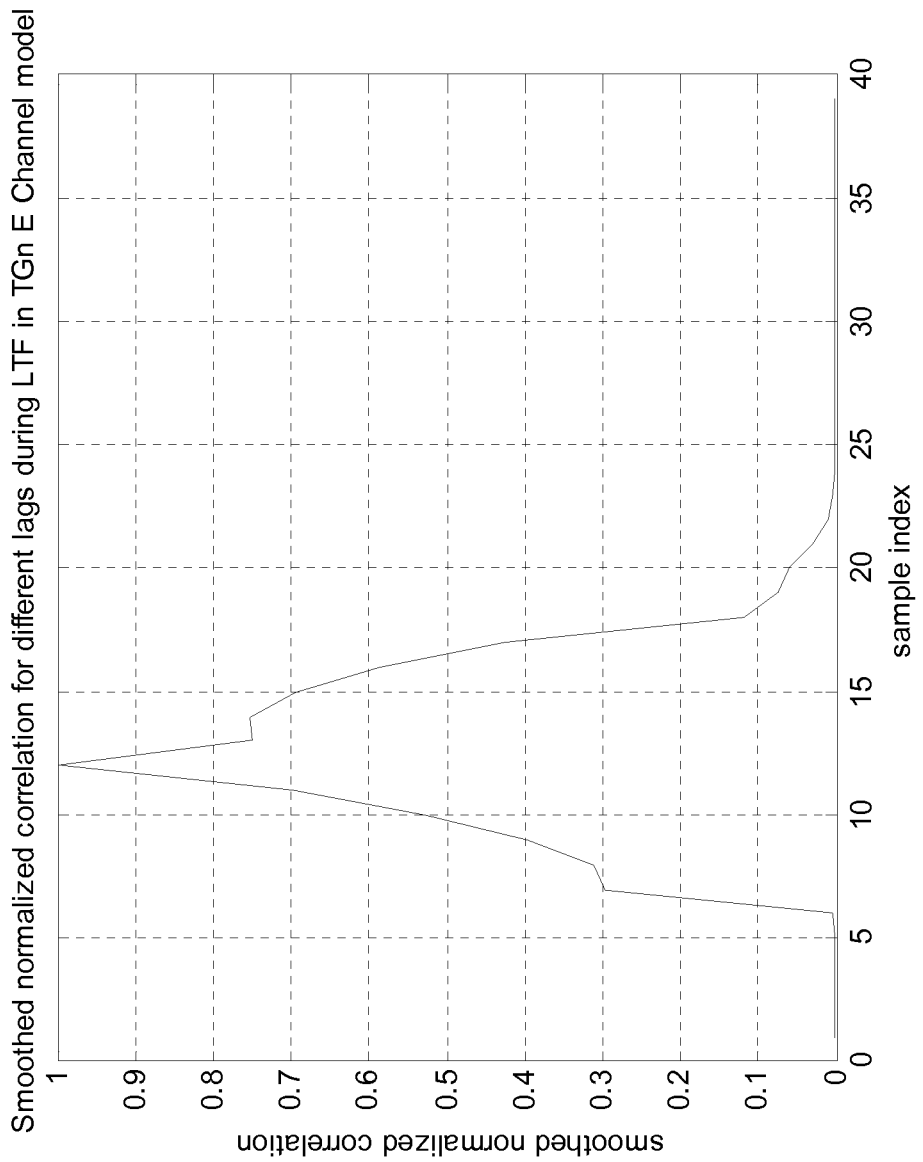
FIG. 11. illustrates an example of smoothened correlation signal in TGN-E channel model.

In accordance with the embodiment, the window estimating unit 304 includes a smoother 308 and a window length estimator 310. The smoother 308 is configured to perform smoothening of the received normalized correlation signal by employing a predefined window Ws. For example, FIG. 10 shows the plot of the normalized correlation of the received LTF symbol in TGN-E channel for 2 transmit and 1 receive antennas (2×1) scenario. The correlation is smoothened using a window Ws of 4 samples and the resultant smoothed correlation is shown in FIG. 11.

Further, the window length estimator 310 coupled to the smoother 308 is configured to estimate an energy window length for the normalized correlation signal. The energy window length includes at least one of channel delay spread and the maximum cyclic shift applied to the signal at the transmitter 101*a*. The aspect of estimating the energy window length is explained in greater detail with reference to FIG. 5.

Figure 12:
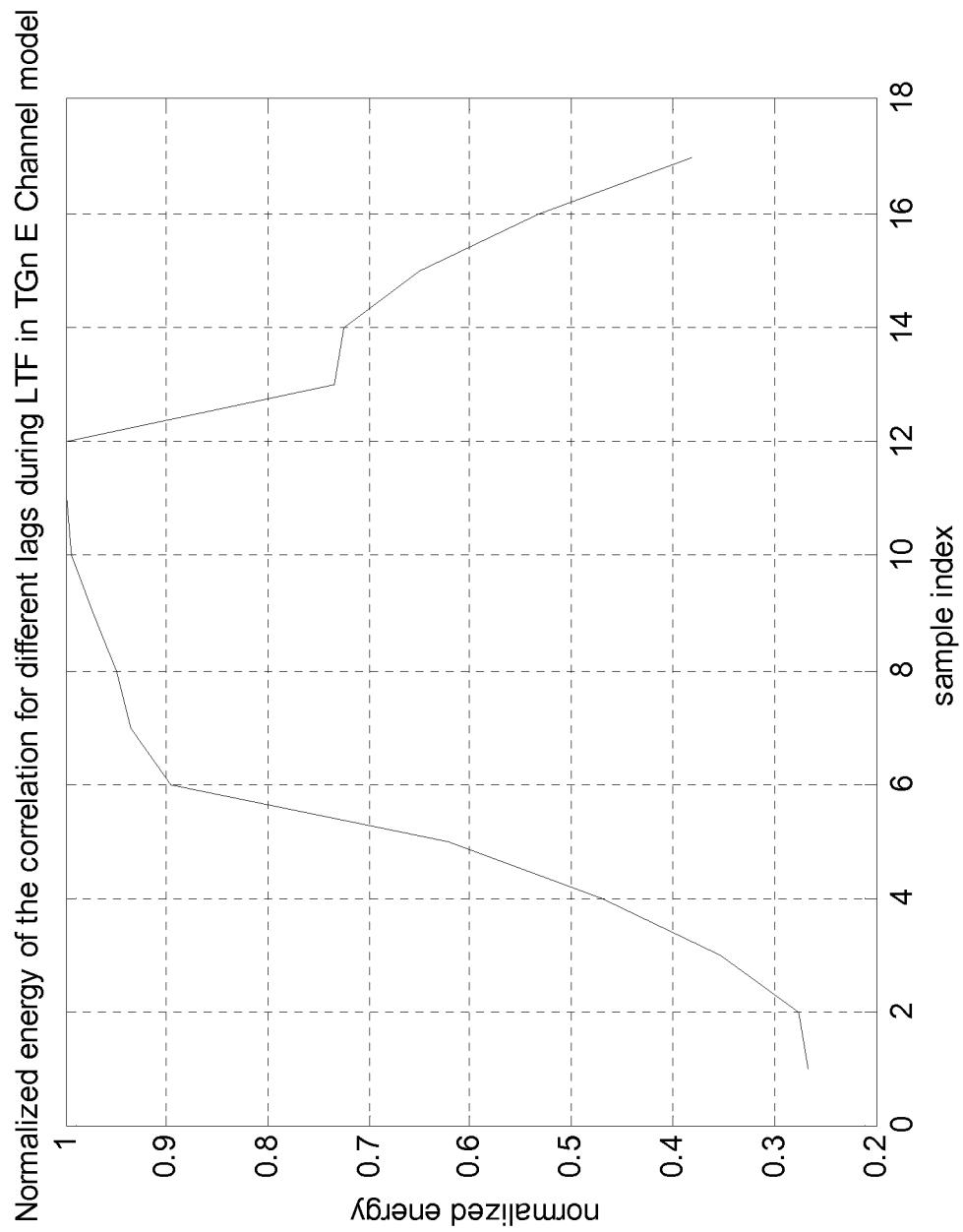
FIG. 12. illustrates an example of energy of the correlation signal in TGN-E channel model.
Figure 13:
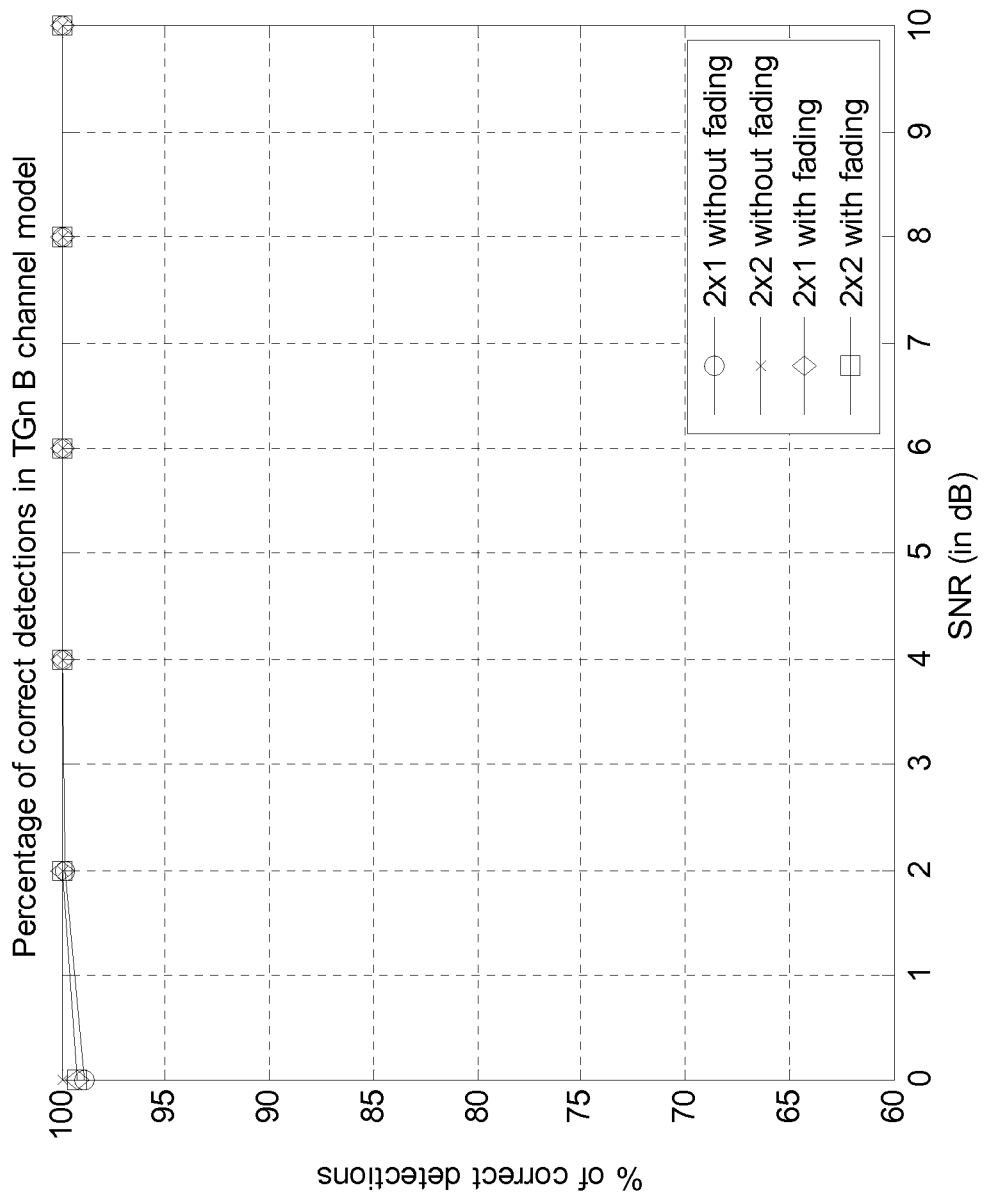
FIGS. 13-18 illustrate simulation results of the method of estimating a symbol boundary for adaptive time synchronization, in accordance with aspects of the present technique.
Figure 14:
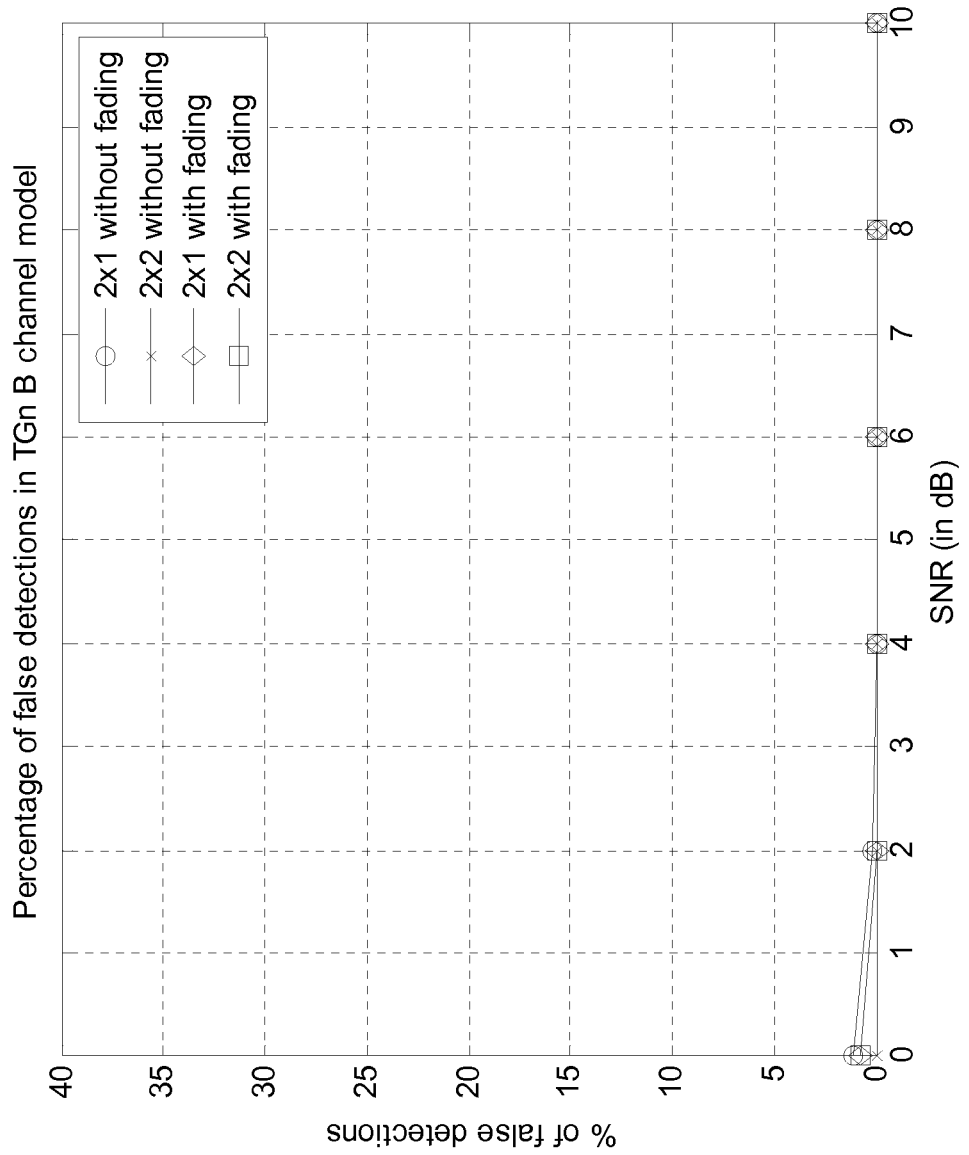
Figure 15:
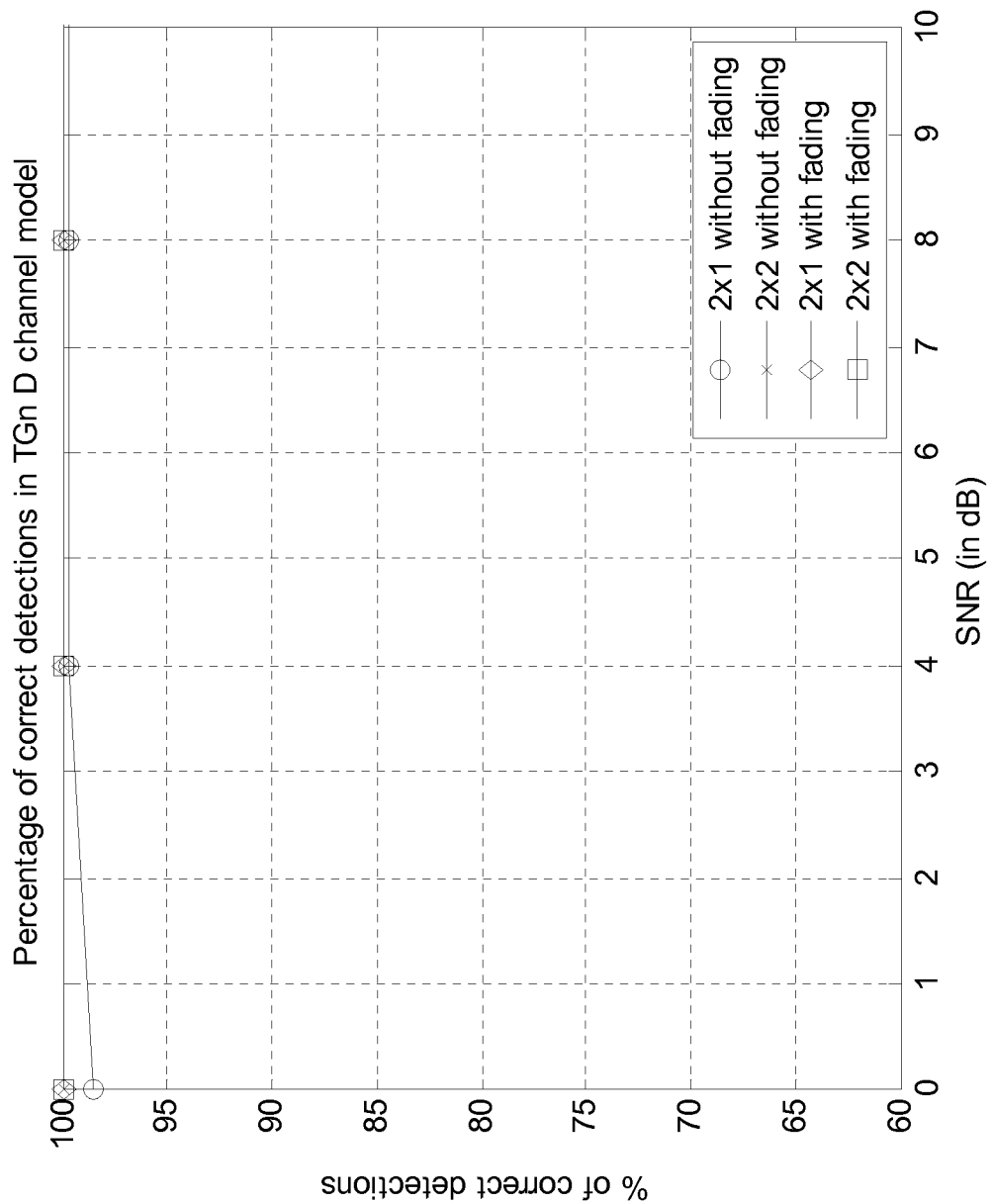
Figure 16:
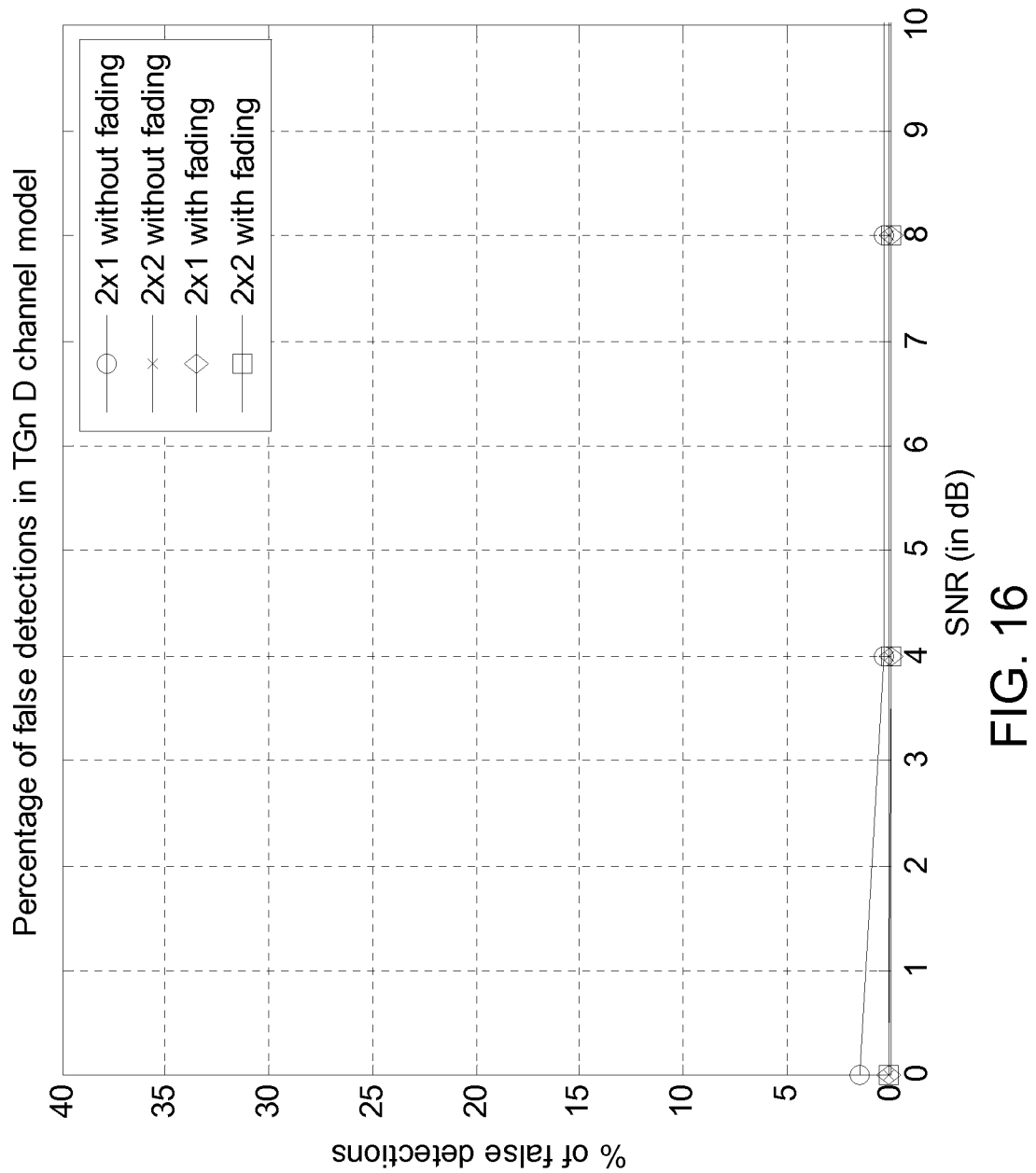
Figure 17:
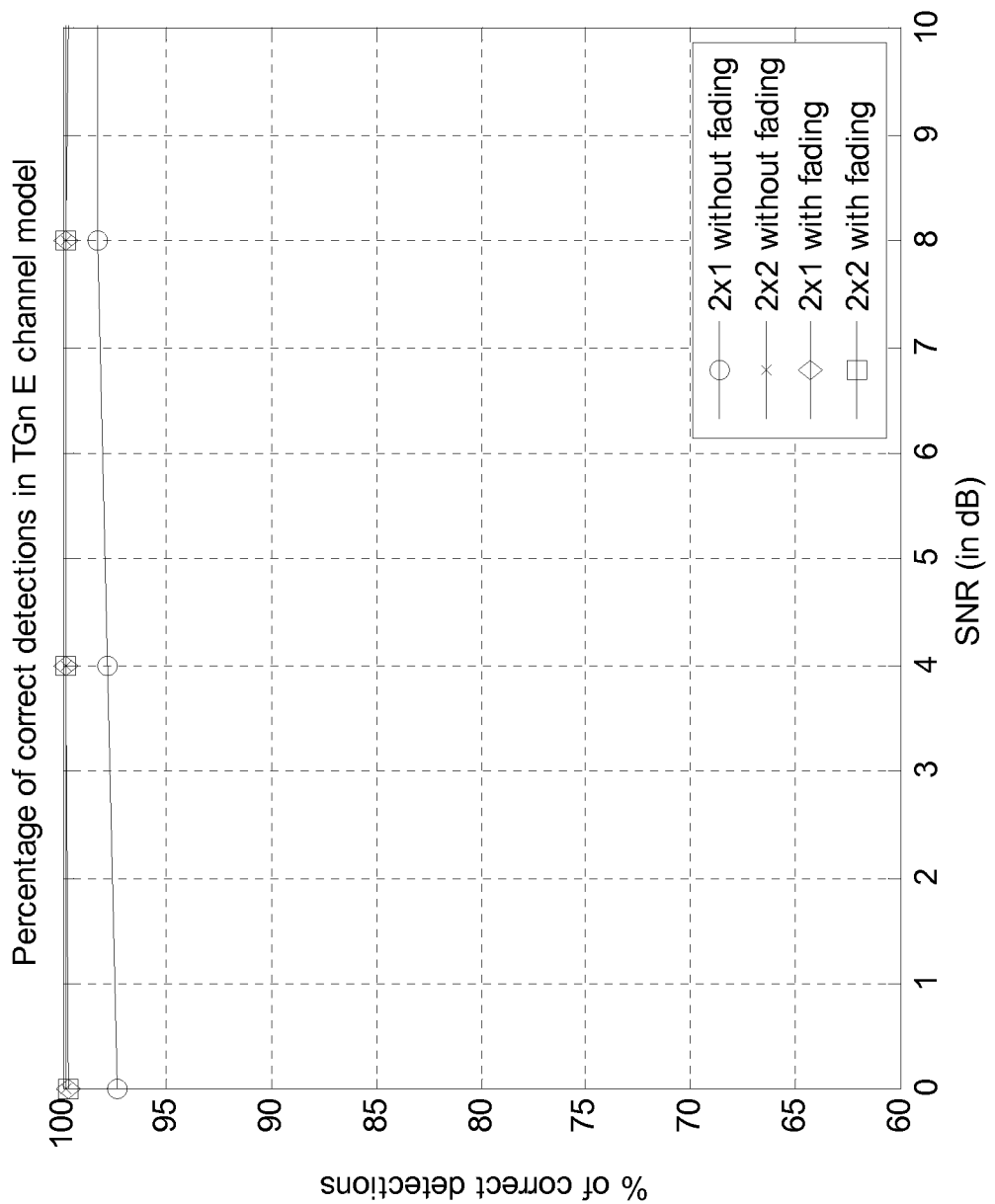
Figure 18:
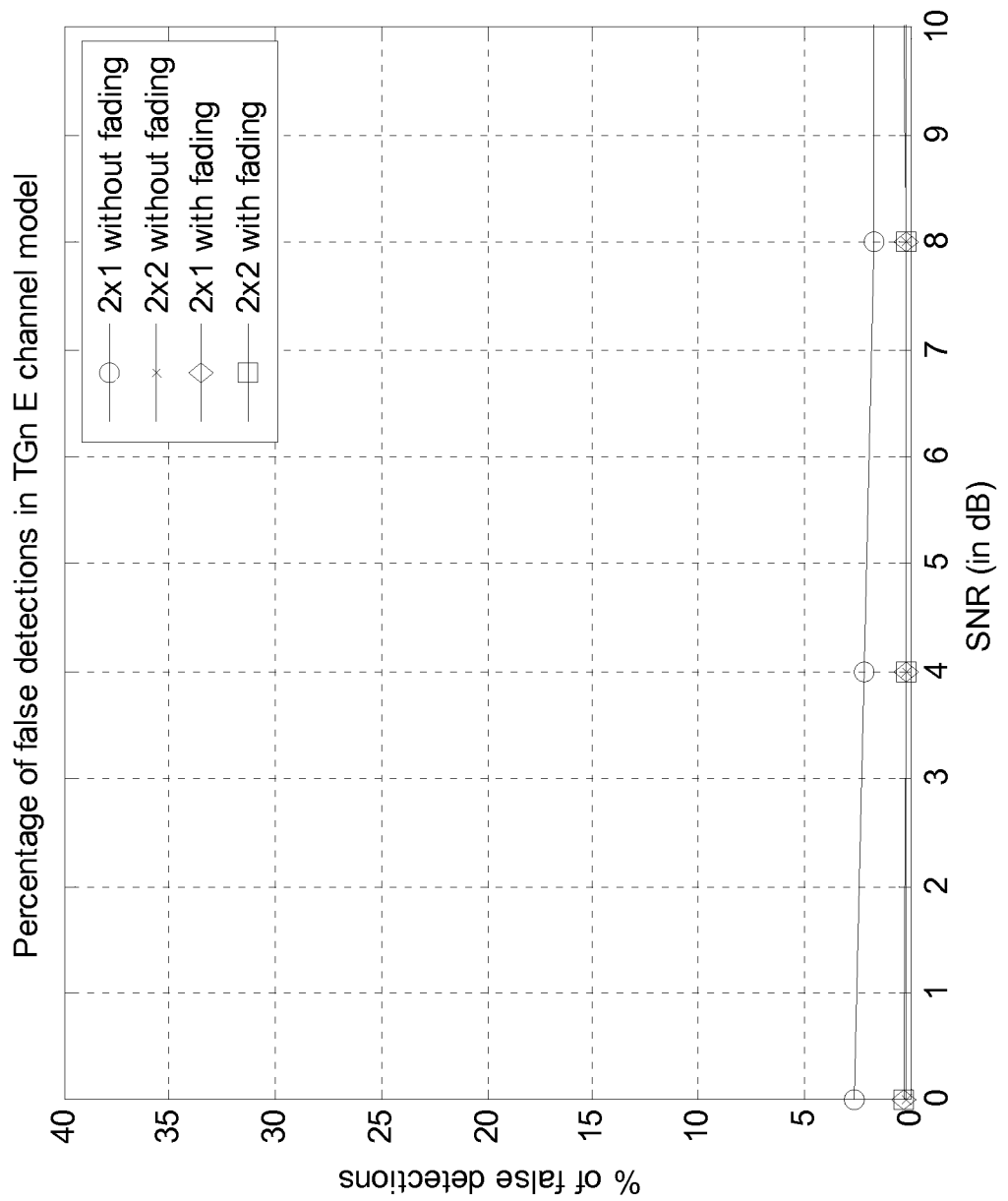

Upon estimating the energy window length for the normalized correlation signal, the symbol boundary estimator 306 is employed to determine a position of peak energy of the normalized correlation signal using the estimated energy window length. The position of the peak energy of the normalized correlation signal is used for estimating the symbol boundary of the LTF symbol. For example, FIG. 12 shows the energy of normalized correlation signal using estimated window length. Further, a sample index 12 represents the position of the peak energy of the normalized correlation signal shown in FIG. 12.

Figure 4:
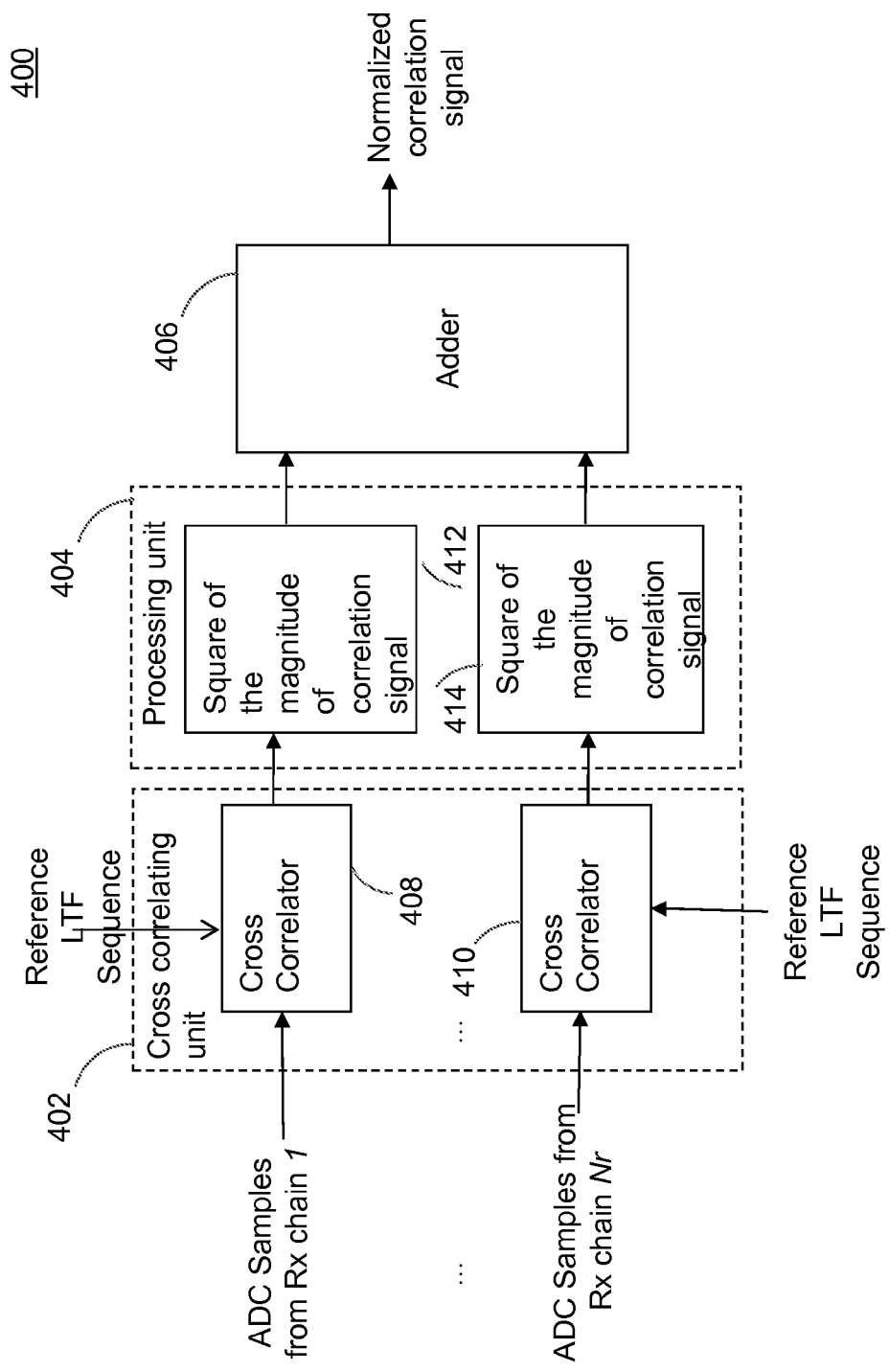
FIG. 4 illustrates a block diagram of a LTF sequence correlator, in accordance with aspects of the present technique.

Referring to FIG. 4, a block diagram of a sequence correlator 400, in accordance with aspects of the present technique, is depicted. The sequence correlator 400 is representative of the sequence correlator 302 of FIG. 3. The sequence correlator 400 includes a cross correlating unit 402, processing unit 404, and an adder 406. The cross correlating unit 402 includes a plurality of cross correlators 408, 410 and each of the cross correlators 408, 410 is communicatively coupled to a corresponding receiver chains of Rx AFE to receive ADC samples.

Further, each cross correlator 408, 410 receives a LTF symbol associated with different cyclic shifts being applied at the transmitter 101*a* and variable channel delay spread. Also, each cross correlator 408, 410 receives a reference LTF symbol as a second input from a pre-stored unit (not shown). Upon receiving the LTF symbol and the reference symbol, each cross correlator 408, 410 computes cross correlation between the received LTF symbol and the reference symbol to obtain a correlation signal. The obtained correlation signal from each of the cross correlators 408, 410 is then sent to the processing unit 404.

In accordance with the embodiment, the processing unit 404 is configured to determine a squared magnitude of the correlation signal for each of the receiver chains. More specifically, sub-processing units 412, 414 process the correlation signal from each cross correlator 408, 410 to estimate a squared magnitude of the correlation signal. Thereafter, the squared magnitude of each of the correlation signals is sent to the adder 406 for summing the squared magnitude of each of the correlation signals. This summing of the squared magnitude of each of the correlation signals results in the normalized correlation signal, which is further provided to the window estimating unit 304 of FIG. 3.

Figure 5:
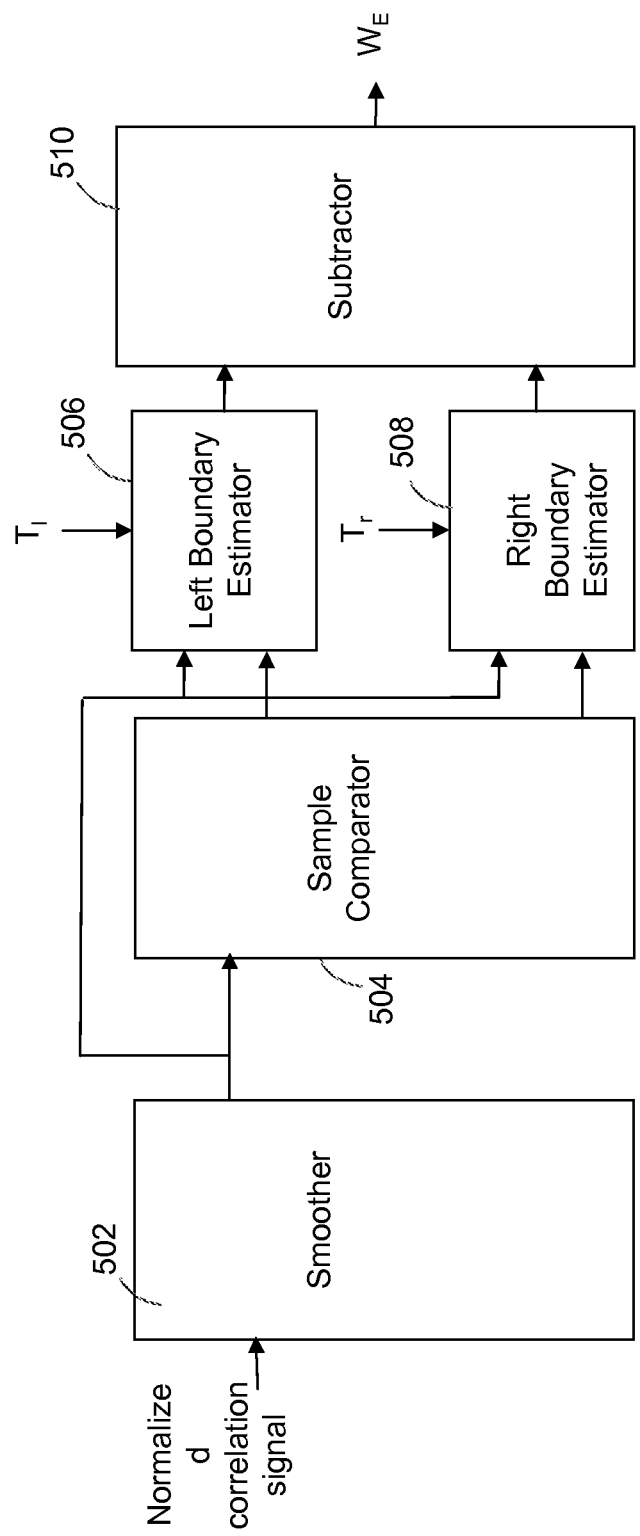
FIG. 5 illustrates a block diagram of a window estimating unit, in accordance with aspects of the present technique.

Referring to FIG. 5, a block diagram of a window estimating unit 500, in accordance with aspects of the present technique, is depicted. The window estimating unit 500 is representative of the window estimating unit 304 of FIG. 3. The window estimating unit 500 includes a smoother 502, a sample comparator 504, a left boundary estimator 506, a right boundary estimator 508, and a subtractor 510. The smoother 502 is representative of the smoother 308 of FIG. 3. The smoother 502 is configured to perform smoothening operation for the normalized correlation signal. More specifically, the received signal or LTF symbol may include random variations in magnitude as depicted in FIG. 10, and these random variations are smoothened using the predefined window Ws to obtain a smoothened signal, as depicted in FIG. 11. For example, for each of samples in the predefined window Ws, 4 consecutive correlation samples may be added to obtain a smoothened signal as shown in FIG. 11.

Upon smoothing the normalized correlation signal, the sample comparator 504, coupled to the smoother 502, is configured to determine a peak magnitude and its position in the smoothened correlation signal. Thereafter, the left boundary estimator 506 is used to determine a first position of a first sample of the smoothened correlation signal that rises above a first threshold $T_l$. The first sample is positioned left to the peak magnitude of the smoothened correlation signal. Particularly, the left boundary estimator 506 determines whether the magnitude of the correlation signal rises above a first threshold value $T_l$ to the left of the peak magnitude. The sample index corresponding to the magnitude rising above the threshold value $T_l$ is represented as the first position and the sample corresponding to this sample index is represented as the first sample.

In a similar manner, the right boundary estimator 508 is configured to determine a second position of a second sample of the smoothened correlation signal that falls below a second threshold $T_r$. The second sample is positioned right to the peak magnitude of the smoothened correlation signal. Particularly, the right boundary estimator 508 determines whether the magnitude of the correlation signal drops below a second threshold value $T_r$ on the right of the peak magnitude. The sample index corresponding to the magnitude falling below the threshold value $T_r$ is represented as the second position and the sample corresponding to this sample index is represented as the second sample.

In accordance with the embodiment, the subtractor 510 coupled to the left boundary estimator 506 and the right boundary estimator 508 is configured to estimate the energy window length $W_E$ based on a difference between the first position of the first sample and the second position of the second sample. The estimated energy window length $W_E$ includes the maximum cyclic shift and channel delay spread associated with the received LTF symbol.

Figure 6:
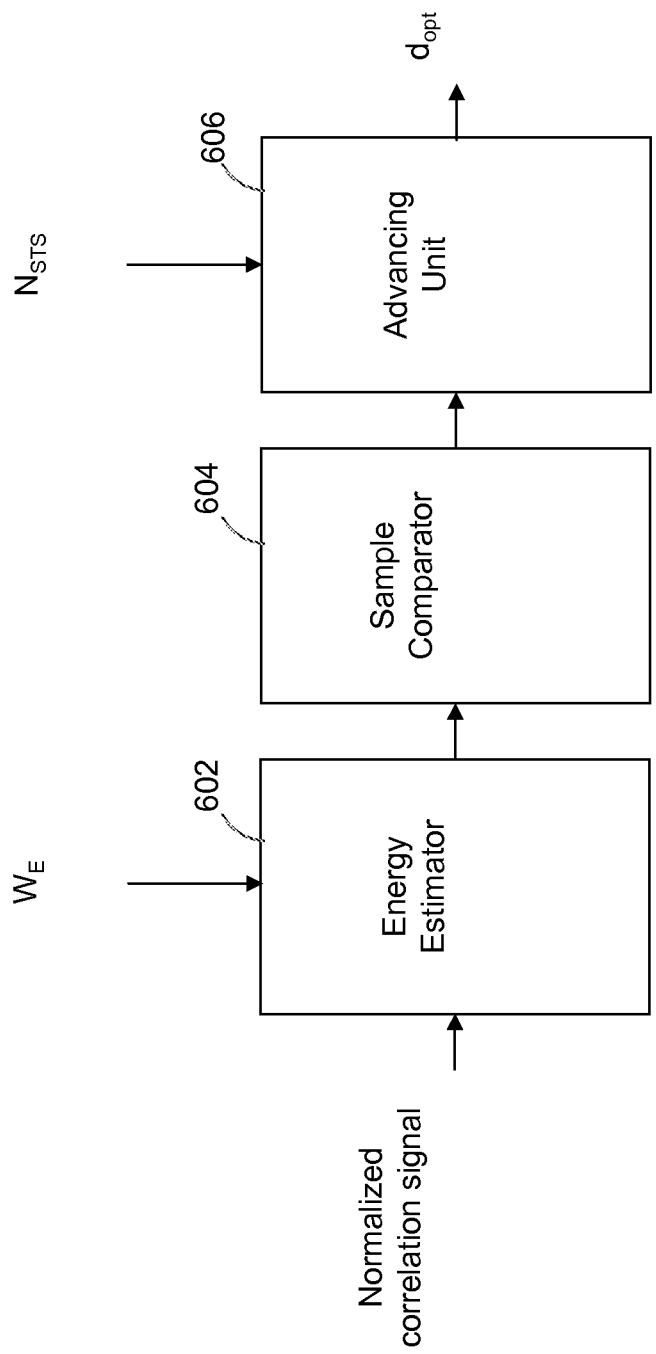
FIG. 6 illustrates a block diagram of a symbol boundary estimator, in accordance with aspects of the present technique.

Referring to FIG. 6, a block diagram of a symbol boundary estimator 600, in accordance with aspects of the present technique, is depicted. The symbol boundary estimator 600 may be representative of the symbol boundary estimator 306 of FIG. 3. The symbol boundary estimator 600 includes an energy estimator 602, a sample comparator 604, and an advancing unit 606. The energy estimator 602 is configured to receive the normalized cross correlation signal from the sequence correlator 302 of FIG. 3. Also, the energy estimator 602 receives the estimated window length W.sub.E from the window length estimator 310 of FIG. 3. Further, the energy estimator 602 determines the energy of the normalized correlation signal using the estimated energy window length W.sub.E. Thereafter, the sample comparator 604 is used to determined peak energy and its position in the normalized correlation signal. The determined position of the peak energy is then used to estimate the symbol boundary of the received LTF symbol. In addition, the one/more signal components of received LTF symbol may have been cyclically shifted at the transmitter 101*a* if there are two or more space time streams (N.sub.STS), by cyclic shift samples. Therefore, the advancing unit 606 determines whether the LTF symbol is received from two or more space time streams. If the number of space time streams (N.sub.STS) is more than one, the estimated symbol boundary is shifted right to correct the error in the estimated symbol boundary due to maximum cyclic shift applied to the signal at the transmitter 101*a*.

In accordance with aspects of the present technique, the combination of the components shown in FIGS. 3-6 may be employed for adaptive fine time synchronization. Also, the method or algorithm of estimating symbol boundary for adaptive fine time synchronization is mathematically explained below.

It is well known that the VHT wireless LAN system is supposed to work in a multipath channel with the maximum channel delay spread of 0.8 micro seconds. Also, each symbol of short training field symbol has duration of 0.8 micro seconds and transmitted symbols are from different antennas are cyclically shifted by a suitable value. Since the short training field symbols has a spread of 0.8 micro seconds and the symbols have different cyclic shift values, the coarse symbol boundary estimated using the symbols of short training field will not be accurate. To resolve the ambiguity of the estimated symbol boundary, a fine synchronization is usually performed.

In the fine time synchronization, the correlation of received signal with the reference signal is computed during the long training field. The sample index corresponding to the peak of energy of the correlation computed over a duration corresponding to GI length will then give the fine symbol boundary. The estimated symbol boundary is likely to be shifted due to channel delay spread and may not be accurate. In addition, the VHT wireless LAN system suffers from the problem of pseudo multipath due to cyclic shift applied at the transmitter 101*a*. These cyclic shifts are different for different parts of the frame and for different frame formats, which are unknown at the receiver. The maximum amount of cyclic shift depends on the number of space time streams (STS). In addition, the channel delay spread is a variable and changes for each channel realization. Therefore, the fine symbol boundary estimation based on the fixed energy window length, as disclosed in the conventional technique, will not give accurate symbol boundary for VHT wireless LAN system. Hence, adaptive time synchronization method/technique is employed to estimate the energy window length in scenarios with varying channel delay spread and cyclic shift applied to the signal at the transmitter 101*a*. The estimation algorithm/method should work for all channel delay spreads upto maximum delays spread, for different cyclic shifts and for different frame formats. Also, this synchronization method/technique should take care of channels with smaller channel delay spreads.

As stated earlier, the proposed time synchronization method begins upon detecting the long training field. The method begins with computing correlation between the received signal on $m^{th}$ receive chain $r_m(n)$ and a reference signal $s(n)$ during the long training field for different lags, which is shown by the below equation.

$$p_m(k) = \sum_{n=0}^{N-1} r_m(n+k) s^*(n) \qquad (1)$$

In equation (1), * in superscript represents complex conjugate operation, N represents the reference long symbol length and k=0, 1, ..., n*L, where L is the length of cyclic prefix and n is an integer equal to 3. Further, upon computing correlation, the magnitude square of the correlation computed in equation (1) on all $N_r$ receiver chains is added as shown below to obtain a normalized correlation signal.

$$P(k) = \sum_{m=1}^{N_r} |p_m(k)|^2 \qquad (2)$$

Thereafter, the width of the channel delay spread including maximum cyclic shift if any, is estimated by performing the smoothing on P(k) using the window length $w_s$ as shown below.

$$Q(k) = \sum_{m=1}^{w_S} P(k+m) \qquad (3)$$

In equation (3), the parameter $w_s$ is tunable and initially $w_s$ value is assumed as 0.2 micros seconds. Further, the peak of Q(k) is determined over a duration of $(n*L-W_S)$ samples. Also, a sample index $d_l$ on left side to peak where Q(k) crossing threshold $T_l$ and a sample index $d_r$ on the right side to peak where Q(k) falling below threshold $T_r$ are determined. Using $d_l$ and $d_r$ the best window length for energy computation is estimated as shown in the below equation.

$$W_E = d_r - d_l + 1 \qquad (4)$$

The window length estimated in equation (4) is further used to compute the energy of correlation for a duration $(n*L-W_E-W_s)$ samples as shown below.

$$E(k) = \sum_{m=1}^{W_E} P(k+m) \qquad (5)$$

Upon determining the window length $W_E$, the fine symbol boundary $d_{opt}$ is estimated by the below equation.

$$d_{opt} = \max_k [E(k)] \qquad (6)$$

Further, the symbol boundary estimated using the equation (6) is later used to perform the rest of the operation to decode signal and data fields in the received frame. However, if the parameter in the signal field, such as the number of space time streams is greater than one, the symbol boundary estimated in equation (6) is advanced by appropriate cyclic shift value as shown in the below equation.

$$d_{opt} = d_{opt} + \text{CS\_SAMPLES} \qquad (7)$$

In channels with very small channel delay spread, the energy computed in equation (5) may give rise to some plateau. Because of this plateau, in the presence of noise, the decision taken in equation (6) may go wrong. To resolve this ambiguity, the comparison operation in equation (6) is modified. For example, while moving from left of the duration $(n*L-W_E-W_S)$, to decide the present sample is larger than previous maximum, the current sample should be greater than by some percent (say 0.5%) of previous maximum.

Figure 7:
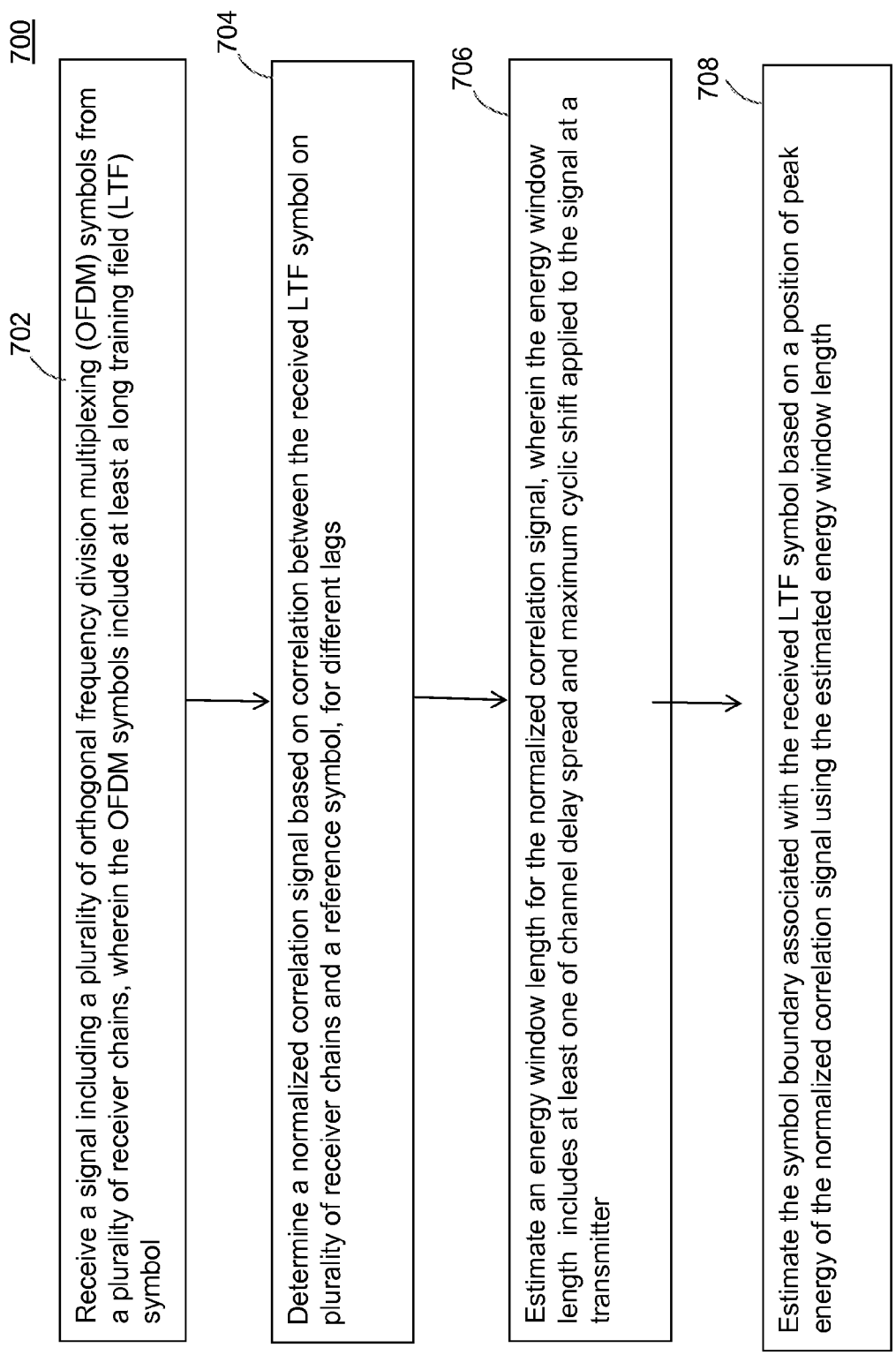
FIG. 7 is a flow chart illustrating a method of estimating a symbol boundary for adaptive time synchronization, in accordance with aspects of the present technique.

Referring to FIG. 7, a flow chart illustrating a method 700 of estimating a symbol boundary for adaptive time synchronization, in accordance with aspects of the present technique, is depicted. For ease of understanding of the present technique, the method 700 is described with reference to the components of FIGS. 1-6. The method 700 begins with a step 702, where the signal including a plurality of OFDM symbols is received by the receiver system 100. The plurality of OFDM symbols includes at least one LTF symbol. For example, the legacy frame includes legacy long training field (L-LTF) symbols, HT-MM frame includes legacy long training field (L-LTF) symbols, and HT long training field (HT-LTF) symbols. Similarly, the HT-GF frame includes HT-LTF symbols, and the VHT frame includes L-LTF symbols and VHT-LTF symbols, as depicted in FIG. 2.

Subsequently, at step 704, the LTF sequence correlator 302 determines a normalized correlation signal based on correlation between the received LTF symbol and a reference symbol for each of the receiver chains for different lags. Particularly, the received LTF symbol is correlated with the reference symbol for each of the receiver chains. Further, squared magnitude of the correlated output is computed for each of the receiver chains. Thereafter, the squared magnitudes of the correlated outputs on all the receiver chains are added to obtain the normalized correlation signal. The exemplary method of determining the normalized correlation signal is explained in greater detail with reference to FIG. 4.

Furthermore, at step 706, the window estimating unit 304 estimates an energy window length for the normalized correlation signal. The energy window length includes at least one of channel delay spread and maximum cyclic shift applied to the signal at the transmitter. Particularly, the normalized correlation signal is smoothened using the smoother 308. Thereafter, for the smoothened normalized correlation signal, the energy window length is estimated. More specifically, the position of the peak magnitude of the normalized correlation signal is estimated. Then, the magnitude of the normalized correlation signal rising above a left threshold value at the left of the peak magnitude is determined. The sample index or position of the sample associated with this magnitude is considered as a first position and the sample is considered as the first sample. Similarly, the magnitude of the normalized correlation signal falling below a right threshold value at the right of the peak magnitude is determined. The sample index or position of the sample associated with this magnitude is considered as a second position and the sample is considered as second sample. Thereafter, the energy window length is estimated based on a difference between the first position of the first sample and the second position of the second sample.

At step 708, the symbol boundary estimator 306 estimates the symbol boundary associated with the received LTF symbol based on a position of peak energy of the normalized correlation signal using the estimated energy window length. Particularly, the symbol boundary estimator 306 identifies the peak energy of the normalized correlation signal using the estimated energy window length. Further, based on a position of the identified peak energy of the normalized correlation signal, the symbol boundary estimator 306 determines a symbol boundary of the LTF field.

In addition, the method or algorithm, as depicted in FIG. 7, of estimating symbol boundary for adaptive fine time synchronization may be mathematically analyzed as described below. For accurate symbol boundary estimation, the effective window length on the correlation signal may be considered to be the sum of the channel delay spread and the maximum cyclic shift value applied to the signal at the transmitter. Without loss of generality, a system of two transmitting antennas and one receiving antenna is considered for analysis. It may be noted that this analysis may be extended to any number of transmitting and receiving antennas.

Further, in IEEE 802.11ac transmitter, transmitted signals from different transmitters are cyclically shifted in order to avoid undesired beam forming. During preamble and signal transmissions, the same OFDM symbols are transmitted from different antennas with a cyclic shift. If the $i^{th}$ transmitter has a cyclic shift delay of $d_i$ (in samples), the output of inverse discrete Fourier transform (IDFT) before adding cyclic prefix, is modified as $$s_i(n) = \begin{cases} s(n-d_i) & 0 \le n \le N + d_i \\ s(n-d_i-N) & N+d_i \le n \le N \end{cases} \quad (8)$$

In equation (8), $s_i(n)$ is the output of IDFT and N is the DFT length. The cyclic prefix is then applied to $s_i(n)$.

$$x_i(n) = \begin{cases} s_i(n+N-L) & 0 \le n \le L-1 \\ s_i(n-L) & L \le n \le N+L-1 \end{cases} \quad (9)$$

In equation (9), L is the length of cyclic prefix. Thereafter, the signal is passed through the transmit filter and analog front end (AFE). The signal at the end of receiver matched filter on jth receive chain is given by $$r_j(n) = \sum_{i=1}^{N_T} \sum_{l=0}^{L-1} h_{ji}(l) x_i(n-l) + w_j(n) \quad (10)$$

In equation (10), $h_{ji}(l)$ is the channel impulse response (CIR) of the channel between $i^{th}$ transmitting antenna and $j^{th}$ receiving antenna with channel delay spread $\tau_i$ and $w_j(n)$ is the samples of additive white Gaussian noise (AWGN). Without loss of generality, a case of two transmit antennas and one receiver antenna system (represented as 2×1) is considered. This is a typical case when space time block coding is employed in the system. For this case, equation (10) can be simplified as $$r_1(n) = \sum_{l=0}^{L-1} h_{11}(l) x_1(n-l) + \sum_{l=0}^{L-1} h_{12}(l) x_2(n-l) + w_1(n) \quad (11)$$

In equation (16), $h_{11}$ is the CIR of the channel between the first transmitter and the receiver with channel delay spread $\tau_1$. $h_{12}$ is the CIR of the channel between the second transmitter and the receiver with channel delay spread $\tau_2$. Using equations (8) and (9), and considering that the cyclic shift on the first transmit chain is zero ($d_1=0$) as recommended in IEEE 802.11ac system, equation (11) is modified as $$r_1(n) = \sum_{l=0}^{L-1} h_{11}(l) s(n-l) + \sum_{l=0}^{L-1} w_{12}(l) s((n-l-d_2) \bmod N) + w_1(n) \quad (12)$$

The R.H.S of equation (12) has two terms. In the first term, signal s(n) is used and in the second term, cyclic shifted s(n) is used. Because of this, in the correlation computation, the spread at two different locations separated by the amount of cyclic shift is obtained. This phenomenon is generally interpreted as pseudo multipath in MIMO wireless systems. The coarse symbol boundary is estimated by cross correlating the received samples during short training fields, with the local sequence.

$$c(d) = \sum_{n=0}^{L-1} r_1(n+d)s_s^*(n) \qquad (13)$$

The index of the maximum amplitude of the cross correlation signal corresponds to the coarse symbol boundary. Because of the pseudo multipath and variation in the channel delay spread, there is uncertainty in the estimated symbol boundary based on correlation peak.

$$d_c = \arg\max_{d \varepsilon (0, L-1)} \|c(d)\| \qquad (14)$$

In equation (14), $d_c$ is the coarse symbol boundary and $s_s(n)$ is local sequence (reference short training symbol). The coarse symbol boundary position varies depending on the instantaneous channel magnitudes ($h_{11}$ and $h_{12}$) and cyclic shift value $d_2$. This causes inter symbol interference in the demodulated symbol. To overcome the pseudo multipath problem and inter symbol interference, fine symbol timing synchronization is proposed.

In the proposed fine symbol boundary estimation, the received samples are cross correlated with local sequence (during long training symbol), the cross correlation values for different time lags are given by, $$p(k) = \sum_{n=0}^{N-1} r_1(n+k)s^*(n) \qquad (15)$$

Substituting equation (12) in equation (15), the below equation is obtained.

$$p(k) = \sum_{n=0}^{N-1} \left( \sum_{l=0}^{L-1} h_{11}(l)s(n+k-l) + \sum_{l=0}^{L-1} h_{12}(l)s((n+k-l-d_2)\text{mod}N) + w_1(n+k) \right) s^*(n) \qquad (16)$$

Expanding and rearranging terms in equation (16), $$p(k) = \sum_{l=0}^{L-1} h_{11}(l) \sum_{n=0}^{N-1} s(n+k-l)s^*(n) + \sum_{l=0}^{L-1} h_{12}(l) \sum_{n=0}^{N-1} s((n+k-l-d_2)\text{mod}N)s^*(n) + \sum_{n=0}^{N-1} w_1(n+k)s^*(n) \qquad (17)$$

The auto correlation of transmitted signal can be written as $$\sum_{n=0}^{N-1} s(n+k-l)s^*(n) + \sigma_S^2 \delta(k-l) \qquad (18)$$

In equation (18), $\sigma_S^2$ is energy of the reference long symbol. Substituting equation (18) in Equation (17) and after simplification, the following equation is obtained.

$$p(k) = \sigma_S^2 h_{11}(k) + \sigma_S^2 h_{12}((k-d_2)\text{mod}N) + \sum_{n=0}^{N-1} w_1(n+k)s^*(n) \qquad (19)$$

As the transmitted signal and the noise are uncorrelated, the magnitude of the third term in equation (19) is very small when compared with the sum of the first two terms and can be ignored for the analysis purpose. The energy is calculated on the squared magnitude of the correlation signal using effective window length (w), for different lags and is given by, $$E(r) = \sum_{k=0}^{w} |p(k+r)|^2 \qquad (20)$$

Substituting equation (19) in equation (20), after simplification the below shown equation is obtained.

$$E(r) = \sigma_S^4 \sum_{k=0}^{w} |h_{11}(k+r)|^2 + \sigma_S^4 \sum_{k=0}^{w} |h_{12}((k+r-d_i)\text{mod}N)|^2 + \qquad (21)$$
$$2\sigma_S^4 \sum_{k=0}^{w} \text{Re}(h_{11}^*(k+r)h_{12}((k+r-d_2)\text{mod}N))$$

In equation (21), as $h_{11}$ and $h_{12}$ are uncorrelated, the third term is very small compared to the first and the second terms, so the third term can be neglected, and equation (21) is simplified as shown below $$E(r) = \sigma_S^4 \sum_{k=0}^{w} |h_{11}(k+r)|^2 + \sigma_S^4 \sum_{k=0}^{w} |h_{12}((k+r-d_2)\text{mod}N)|^2 \qquad (22)$$

From equation (22), it is evident that to capture the total energy due to sub channel multipath channel delay spreads, the effective window length w should be sum of the MIMO channel delay spread $\tau$ and cyclic shift $d_2$ where the MIMO channel delay spread $\tau$ is taken as the maximum of individual channel delay spreads $\tau_1$ and $\tau_2$. The MIMO channel delay spread is usually termed merely as channel delay spread of the MIMO channel. In general for m transmits antennas and n receiver antenna MIMO OFDM system, the effective window length in the fine symbol boundary estimation should be the sum of the channel delay spread of the MIMO channel and the maximum cyclic shift value applied to signal at the transmitter. Since the maximum cyclic shift value is unknown at the receiver and the width of the channel delay spread is a variable, there is a need to estimate effective window size for finding the fine symbol boundary.

Referring to FIGS. 13-18, simulation results obtained by employing the system and method described in FIGS. 1-7 are depicted. These simulation results emphasize the usefulness of the present technique in real systems. Moreover, the simulations are performed in the multipath fading channels to prove that the present technique is a robust and adaptive time synchronization technique. In the simulations, two transmitting antennas and one receiving antenna (represented as 2×1) scenario and, two transmitting antennas and two receiving antennas (represented as 2×2) scenario are considered.

Further, to obtain the simulation results as depicted in FIGS. 13-18, a VHT mixed format packet is first formed with preamble, signal fields, and data as shown in FIG. 2. As previously noted with reference to FIG. 2, the preamble of the frame includes short training field symbols and long training field symbols. At the transmitter side, only one-fourth of the used subcarriers are loaded for generating the short symbols, while 52 subcarriers are loaded for generating the long symbols. Further, transmission of the frame begins with first transmitting the preamble of the frame. The preamble is followed by signal field and then sequences of data field of the frame. Appropriate cyclic shift value is applied to the signal transmitted from the second antenna.

Moreover, to obtain the simulation results as depicted in FIGS. 13-18, the frame or signal is transmitted using an analog front end (AFE) modeled section with Tgn channel models and RF impairments. The AFE section consists of DAC/ADC, filters, up/down converters, AWGN, RF impairments and Tgn channel models (A, B, C, D, E and F). The Tgn channel is modeled for the MIMO scenarios 2×1 and 2×2. While transmitting the signal or frame from the transmitter side to the receiver side, the channel model introduces the pathloss and fading to the transmitted signals. The transmit power is divided equally among the multiple transmit signals. In the exemplary embodiment, the relation between the transmit power of the signal, SNR, and the pathloss is given by the following equation:

$$\text{Pathloss (db)} = \text{TX\_POWER} - \text{SNR} - \text{N\_FIG} \quad (23)$$

In equation (23), TX_POWER represents the power transmitted by a transmitter, SNR represents the required Signal to Noise Ratio (SNR) at the receiver, and N_FIG is the noise figure. In the simulation setup, the SNR is varied from 0 dB to 10 dB with fading enabled using the Tgn channel models B, D and E. The channel models are selected to cover low, medium, and high channel delay spread scenarios. For each SNR, a different transmit frame is generated and passed through the channel and AWGN noise and other impairments.

At the receiver system 100, after ADC and filtering, energy detection, AGC gain estimation, coarse time synchronization, long training field detection (S2L detection) are performed. Thereafter, the symbol boundary is estimated using the adaptive fine time synchronization method described in FIG. 7. The simulations are performed for 1000 realizations of channel and noise for legacy, HT, and VHT frame formats using the channel bandwidth of 20 MHz. It may be noted that the method described herein above also works well for all other bandwidth (BW) options such as 40, 80, and 160 MHz and for other MIMO scenarios. For 1000 realizations, the percentage of correct detections and false detections are computed. If the estimated symbol boundary is in the inter symbol interference (ISI) free region of cyclic prefix, then it is taken as the correct detection and otherwise it is taken as false detection. The results with percentage of correct and false detections at different SNR are shown in FIGS. 13-18 for different channel models.

From the FIGS. 13-18, it is inferred that the percentage of correct detections reaches 100% at SNR of 4 dB in channels B and D. In high channel delay spread channel E, the probability of correct detections crosses 96% at SNR of 4 dB.

Thus, the method and systems described hereinabove aid in adaptive fine time synchronization in a wireless communication system. Also, the method and systems may synchronize all frame formats even under degrading channel condition because, in addition to coarse symbol boundary estimation, the method employs fine symbol boundary estimation by using adaptive window length estimation.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of estimating a symbol boundary for adaptive time synchronization in a communication system, the method comprising:

receiving a signal comprising a plurality of orthogonal frequency division multiplexing (OFDM) symbols from a plurality of receiver chains, wherein the OFDM symbols include at least a long training field (LTF) symbol;

determining a normalized correlation signal based on correlation between the received LTF symbol and a reference symbol for each of the receiver chains for different lags;

estimating an energy window length for the normalized correlation signal, wherein the estimated energy window length comprises at least one of channel delay spread and maximum cyclic shift applied to the signal at a transmitter; and estimating the symbol boundary associated with the received LTF symbol based on a position of peak energy of the normalized correlation signal using the estimated energy window length.

2. The method of claim 1 further comprising:

determining that the cyclic shift is applied to the signal at a transmitter system; and advancing the estimated symbol boundary based on the maximum cyclic shift applied to the signal at the transmitter.

3. The method of claim 2, wherein the estimated symbol boundary is advanced by adding number of samples associated with the maximum cyclic shift applied to the signal at the transmitter to the estimated symbol boundary.

4. The method of claim 1, wherein the received LTF symbol associated with different cyclic shifts and channel delay spread is received by each of the receiver chains.

5. The method of claim 1, wherein determining the normalized correlation signal comprises:

correlating the received LTF symbol with the reference symbol to obtain a correlation signal for each of the receiver chains for different lags;

determining a squared magnitude of the correlation signal for each of the receiver chains; and summing the squared magnitude of the correlation signal for each of the receiver chains to obtain the normalized correlation signal.

6. The method of claim 1, wherein estimating the energy window length for the normalized correlation signal comprises:

smoothening the normalized correlation signal using a predefined window to obtain a smoothened correlation signal;

detecting a position of a peak magnitude of the smoothened correlation signal;

determining a first position of a first sample of the smoothened correlation signal raising above a first threshold, wherein the first sample is positioned left to the position of the peak magnitude of the smoothened correlation signal;
determining a second position of a second sample of the smoothened correlation signal falling below a second threshold, wherein the second sample is positioned right to the position of the peak magnitude of the smoothened correlation signal; and
estimating the energy window length based on a difference between the first position of the first sample and the second position of the second sample in the predefined window.

7. The method of claim 1, wherein estimating the symbol boundary associated with the received LTF symbol comprises:
identifying the position of the peak energy of the normalized correlation signal using the estimated energy window length; and
determining a symbol boundary based on the position of the identified peak energy of the normalized correlation signal using the estimated energy window length.

8. The method of claim 7, wherein identifying the position of the peak energy of the normalized correlation signal comprises determining the position of the peak energy of the normalized correlation signal when a sample associated with the peak energy is greater than a previous maximum sample by a predefined amount.

9. An apparatus for estimating a symbol boundary in a communication system, the apparatus comprising:
a plurality of receiver chains configured to receive a signal comprising a plurality of orthogonal frequency division multiplexing (OFDM) symbols, wherein the OFDM symbols include at least a long training field (LTF) symbol;
a LTF sequence correlator communicatively coupled to the plurality of receiver chains, and configured to determine a normalized correlation signal based on correlation between the received LTF symbol and a reference symbol for each of the receiver chains for different lags;
a window length estimator communicatively coupled to the LTF sequence correlator, and configured to estimate an energy window length for the normalized correlation signal, wherein the energy window length comprises at least one of channel delay spread and cyclic shift applied to the signal at a transmitter; and
a symbol boundary estimator communicatively coupled to the window length estimator, and configured to estimate the symbol boundary associated with the received LTF symbol based on a position of peak energy of the normalized correlation signal using the estimated energy window length.

10. The apparatus of claim 9, wherein each of the receiver chains receives the LTF symbol associated with different cyclic shifts and channel delay spreads.

11. The apparatus of claim 9, wherein the LTF sequence correlator comprises:
a cross correlating unit communicatively coupled to the receiver chains, and configured to correlate the received LTF symbol with the reference symbol to obtain a correlation signal for each of the receiver chains;
a processing unit communicatively coupled to the cross correlating unit, and configured to determine a squared magnitude of the correlation signal for each of the receiver chains; and
an adder communicatively coupled to the processing unit, and configured to sum the squared magnitude of the correlation signal for each of the receiver chains to obtain the normalized correlation signal.

12. The apparatus of claim 9, wherein the window length estimator comprises:
a smoother communicatively coupled to the LTF sequence correlator, and configured to smoothen the normalized correlation signal using a predefined window to obtain a smoothened correlation signal;
a sample comparator configured to detect a position of a peak magnitude of the smoothened correlation signal;
a left boundary estimator configured to determine a first position of a first sample of the smoothened correlation signal raising above a first threshold, wherein the first sample is positioned left to the position of the peak magnitude of the smoothened correlation signal;
a right boundary estimator configured to determine a second position of a second sample of the smoothened correlation signal falling below a second threshold, wherein the second sample is positioned right to the position of the peak magnitude of the smoothened correlation signal; and
a subtractor configured to estimate the energy window length based on a difference between the first position of the first sample and the second position of the second sample in the predefined window.

13. The apparatus of claim 9, wherein the symbol boundary estimator comprises:
an energy estimator configured to determine the energy of the normalized correlation signal using the estimated energy window length;
a sample comparator configured to:
determine the position of the peak energy of the normalized correlation signal;
estimate the symbol boundary based on the position of the peak energy of the normalized correlation signal; and
an advancing unit configured to advance the estimated symbol boundary based on the maximum cyclic shift applied to the signal at the transmitter.

14. The apparatus of claim 13, wherein the sample comparator is configured to determine the position of the peak energy of the normalized correlation signal when a sample associated with the peak energy is greater than a previous maximum sample by a predefined amount.

15. The apparatus of claim 13, wherein the advancing unit advances the estimated symbol boundary by adding number of samples associated with the maximum cyclic shift applied to the signal at the transmitter to the estimated symbol boundary.

16. A method for adaptive time synchronization in a communication system, the method comprising:
receiving a signal comprising a plurality of orthogonal frequency division multiplexing (OFDM) symbols from a plurality of receiver chains, wherein the OFDM symbols include at least a long training field (LTF) symbol;
adaptively estimating an energy window length comprising at least one of channel delay spread and maximum cyclic shift applied to the signal at a transmitter;
estimating a symbol boundary associated with the received LTF symbol based on a position of peak energy of a normalized correlation signal using the estimated energy window length; and
advancing the estimated symbol boundary based on the maximum cyclic shift applied to the signal at the transmitter.

17. The method of claim 16, wherein adaptively estimating the energy window length comprises:

computing correlation between the received LTF symbol and a reference symbol for each of the receiver chains and summing a squared magnitude of the computed correlation for the plurality of receiver chains to obtain the normalized correlation signal; and estimating an energy window length for the normalized correlation signal, wherein the energy window length comprises at least one of channel delay spread and maximum cyclic shift applied to the signal at the transmitter.

18. The method of claim 17, wherein computing the correlation between the received LTF symbol and the reference symbol comprises:

correlating the received LTF symbol with the reference symbol to obtain a correlation signal for each of the receiver chains;

determining the squared magnitude of the correlation signal for each of the receiver chains; and summing the squared magnitude of the correlation signal for each of the receiver chains and normalizing the summed squared magnitude to obtain the normalized correlation signal.

19. The method of claim 17, wherein estimating the energy window length for the normalized correlation signal comprises:

smoothening the normalized correlation signal using a predefined window to obtain a smoothened correlation signal;

detecting a position of a peak magnitude of the smoothened correlation signal;

determining a first position of a first sample of the smoothened correlation signal raising above a first threshold, wherein the first sample is positioned left to the position of the peak magnitude of the smoothened correlation signal;

determining a second position of a second sample of the smoothened correlation signal falling below a second threshold, wherein the second sample is positioned right to the position of the peak magnitude of the smoothened correlation; and estimating the energy window length based on a difference between the first position of the first sample and the second position of the second sample in the predefined window.

20. The method of claim 16, wherein estimating the symbol boundary associated with the received LTF symbol comprises:

identifying the position of the peak energy of the normalized correlation signal using the estimated energy window length; and determining a symbol boundary based on the position of the identified peak energy of the normalized correlation signal.

21. The method of claim 20, wherein identifying the position of the peak energy of the normalized correlation signal comprises determining the position of the peak energy of the normalized correlation signal when a sample associated with the peak energy is greater than a previous maximum sample by a predefined amount.

22. The method of claim 20, wherein determining the symbol boundary comprises identifying the symbol boundary for adaptive time synchronization of the received signal associated with different values of channel delay spread and cyclic shift applied to the signal at the transmitter.

23. The method of claim 16, wherein advancing the estimated symbol boundary comprises extending the estimated symbol boundary by adding number of samples associated with the maximum cyclic shift applied to the signal at the transmitter to the estimated symbol boundary.

* * * * *